United States Patent
Biebesheimer et al.

(10) Patent No.: US 7,877,293 B2
(45) Date of Patent: Jan. 25, 2011

(54) USER CONTEXT BASED DISTRIBUTED SELF SERVICE SYSTEM FOR SERVICE ENHANCED RESOURCE DELIVERY

(75) Inventors: Debra L. Biebesheimer, Carmel, NY (US); Donn P. Jasura, Pleasant Valley, NY (US); Neal M. Keller, Hawthorne, NY (US); Juhnyoung Lee, Yorktown Heights, NY (US); Steve J. Rolando, Katonah, NY (US)

(73) Assignee: International Business Machines Corporation, Armonk, NY (US)

( * ) Notice: Subject to any disclaimer, the term of this patent is extended or adjusted under 35 U.S.C. 154(b) by 2708 days.

(21) Appl. No.: 10/388,277

(22) Filed: Mar. 13, 2003

(65) Prior Publication Data
US 2004/0181457 A1 Sep. 16, 2004

(51) Int. Cl.
*G06Q 30/00* (2006.01)
*G06F 15/16* (2006.01)

(52) U.S. Cl. .......................... 705/26; 725/87
(58) Field of Classification Search .............. 705/26
See application file for complete search history.

(56) References Cited

U.S. PATENT DOCUMENTS 5,704,017 A 12/1997 Heckerman et al.
6,322,504 B1 11/2001 Kirshner
6,349,134 B1 2/2002 Katz 2002/0083025 A1* 6/2002 Robarts et al. ............. 706/12
2003/0229900 A1* 12/2003 Reisman ...................... 725/87

FOREIGN PATENT DOCUMENTS

WO WO 00/45319 8/2000
WO WO 01/27831 A1 4/2001

OTHER PUBLICATIONS

"ABSolute,"IBM alpha Works Site, http:alphaworks.ibm.com/tech/absolute/Aug. 2001, The evaluation version of ABSolute on this site has been downloaded about 1,000 times since Aug. 2001.
J. Lee and H. Lee, "Method and Visual Interface for Evaluating Multi-Attribute Bids in a Network Environment, "Patent Application filed in the U.S. Patent and Trademark Office in Feb. 2001, IBM.
J. Lee, "Business Method Using a Visual Interface for Evaluating Multi-Attribute Bids Submitted to RFQ (Request for Quotation) in an Electronic Marketplace in a Network Environment," Patent applciation filed in the U.S. Patent and Trademark Office in Oct. 2000, IBM.

* cited by examiner

*Primary Examiner*—Matthew S Gart
*Assistant Examiner*—Garcia Ade
(74) *Attorney, Agent, or Firm*—Scully, Scott, Murphy & Presser, P.C.; Daniel P. Morris, Esq

(57) ABSTRACT

Disclosed is a method and system of providing user context-based services over computer networks, using mechanisms for collecting and specifying one or more user context elements, each element representing a context associated with the current buyer state and having context attributes and attribute values associated therewith, mechanisms for collecting affective (emotive) data to inform the user context, and also an interactive graphical view to gain insight into available services for assisting in understanding available service information and making decisions on purchasing.

14 Claims, 18 Drawing Sheets

FIG. 2

USER AFFECTIVE DATA MANAGEMENT WORKSPACE

Types of Data to Collect

Weight

- [ ] Temp-emotion move ___%
- [ ] Visual attention ___%
- [ ] Facial expression ___%
- [ ] Voice Characteristic ___%
- [ ] Palm sweat ___%

Actions authorized

- [ ] Real time changes suggested
- [ ] Report at conclusion of service delivery
- [ ] Implement for next use of service

This figure provides examples of data elements from the travel services and education services domains given example user interactions with the User Context Based Distributed Self Service System for Service Enhanced Resource Delivery via the graphical Interfaces.

|  | Travel Services |
|---|---|
| User Affective Data | 50% palm sweat |
|  | 50% voice characteristic |
|  | Real time changes suggested |
| Previous Service Packages | 3/2001 trip to Vermont |
|  | 6/2000 trip to Maine |
|  | 4/1999 trip to Colorado |
| User Query | Plan a trip to Vermont in June |
| User Context | Business travelers |
|  | Single mom with kids |
|  | Swinging single |
|  | Others |
| Context Attribute | Mode of transportation |
|  | Mode of housing |
|  | Food style |
| Resource Attribute Value | Drive |
|  | Fly |
|  | Train |
| Value Resource Parameters | Include: |
|  | - all major carriers |
|  | Exclude: |
|  | - prop planes |
|  | - airlines with bad safety records |
| Combined Primary Service and Service Enhancers Criteria Values | overall cost |
|  | primary service cost |
|  | duration |
|  | timing |
|  | quality |
|  | risk |
| Service Enhancers | Beverage |
|  | Music |
|  | Electronic games |
|  | Electronic mall |
|  | Movies |
| Service Enhancer Choices | Wine |
|  | Beer |
|  | Martini |

FIG. 14

|   |   |
|---|---|
|   | Education Services |
| User Affective Data | 50% palm sweat |
|   | 50% voice characteristics |
|   | Real time changes suggested |
| Previous Service Packages | Learn stereo design by distance learning |
|   | Learn C++ by self study |
|   | Learn Java by taking classes |
| User Query | Learn Linux development by distance learning |
| User Context | Traveling consultant |
|   | Corporate executive at headquarters |
|   | Commuting techie |
|   | Remote staffie |
| Context Attribute | Connectivity |
|   | Mentoring Method |
|   | Self study Method |
| Resource Attribute Value | Text chat |
|   | Phone |
|   | Email |
| Value Resource Parameters | Include: |
|   | - all licensed Linux education providers |
|   | Exclude: |
|   | - mentors without business experience |
|   | - mentors with poor quality ratings |
| Combined Primary Service and Service Enhancers | overall cost |
| Criteria Values | primary service cost |
|   | duration |
|   | timing |
|   | quality |
|   | risk |
| Service Enhancers | Real time technical terms glossary |
|   | Webconferencing for screen sharing |
|   | Webcam to see mentor |
|   | Transcript summarizer |
|   | Language Translation |
| Service Enhancer Choices | Sametime |
|   | Netmeeting |
|   | Placeware |

USER CONTEXT BASED DISTRIBUTED SELF SERVICE SYSTEM FOR SERVICE ENHANCED RESOURCE DELIVERY

RELATED APPLICATIONS

The present invention is related to subject matter disclosed in the following patent applications, the disclosures of which are herein incorporated by reference in their entireties.
1. Patent application Ser. No. 09/778,146, filed Feb. 7, 2001, for CUSTOMER SELF SERVICE SYSTEM FOR RESOURCE SEARCH AND SELECTION.
2. Patent application Ser. No. 09/778,136, filed Feb. 7, 2001, for CUSTOMER SELF SERVICE ICONIC INTERFACE FOR PORTAL ENTRY AND SEARCH SPECIFICATION.
3. Patent application Ser. No. 09/778,147, filed Feb. 7, 2001, for CUSTOMER SELF SERVICE ICONIC INTERFACE FOR RESOURCE SEARCH RESULTS DISPLAY AND SELECTION.
4. Patent application Ser. No. 09/778,378, filed Feb. 7, 2001, for CUSTOMER SELF SERVICE SUBSYSTEM FOR CLASSIFYING USER CONTEXTS.
5. Patent application Ser. No. 09/778,135, filed Feb. 7, 2001, for CUSTOMER SELF SERVICE SUBSYSTEM FOR ADAPTIVE INDEXING OF RESOURCE SOLUTIONS AND RESOURCE LOOKUP.
6. Patent application Ser. No. 09/778,139, filed Feb. 7, 2001, for CUSTOMER SELF SERVICE SUBSYSTEM FOR RESPONSE SET ORDERING AND ANNOTATION.
7. Patent application Ser. No. 09/778,149, filed Feb. 7, 2001, for CUSTOMER SELF SERVICE SUBSYSTEM FOR CONTEXT CLUSTER DISCOVERY AND VALIDATION.
8. Patent application Ser. No. 09/723,236, filed Nov. 28, 2000, for "Method and Visual Interface for Evaluating Multi-Attribute Bids in a Network Environment."
9. Patent application Ser. No. 09/800,664, filed Mar. 8, 2001, for "Method and Visual Interface for Evaluating Multi-Attribute Bids in a Network Environment."

BACKGROUND OF THE INVENTION

1. Field of the Invention

This invention relates generally to the composition (creation), execution (delivery), and monitoring (measurement) of context-based, customized service bundles over computer networks. More specifically, this invention relates to user context based distributed self service system with decision support capabilities.

2. Background Art

Prior systems for service purchase decision support and delivery, including those multi-attribute systems for purchasing support, make use of available simple historical and current user data and demographic data, and/or extensive profiles completed by the user to provide personalization. They do not, however, develop user contexts based on adaptive algorithms and supervised and unsupervised learning sub-processes and do not include the use of affective data. Prior systems also do not support the real time configuration, comparison and selection of service packages, do not make use of visual decision support tools and do not provide for the real time management of the services bundle during execution.

Current systems generally focus on purchase decision support and are developed for a single domain such as a telephone system or car radio and the functionalities and interfaces learned by the user cannot be generalized to similar services purchase and execution tasks in other domains. Some of the systems have been developed specifically for push functionality and use a specific type of interaction with the user such as interactive questioning via an expert system.

Other systems which make use of Bayesian Network data mining techniques make use of adaptive algorithms and supervised learning but do not make use of the variety of historical, contextual and affective data and do not apply the predictive models to purchasing decision support in various domains.

Web usage mining tools analyze web traffic and sales data for two purposes: (1) system and network performance analysis (for performance optimization), and (2) marketing and merchandising (product assortment, web design, cross-sells, and up-sells, email promotion, portal advertisements, referral services). Web mining tools are used to categorize and segment users and to provide personalized services to users and collaborative filtering is widely used by retailers.

Other systems use dynamic pricing but provide only forward (seller initiated) auctions as opposed to reverse (buyer initiated) auctions. Other systems using auctions for dynamic pricing do not allow auctions based on a bundling of services from different providers.

While OLAP (Online Analytical Processing) capabilities built on top of relational database management systems provide decision support capabilities including multi-dimensional data models (also known as star schema) and exploratory analysis capability through pivot, roll-up, and drill-down operations for different dimensions, they, along with visual decision support tools, do not provide extensive capabilities of the Absolute tool. They do not provide confirmatory analysis, what-if analysis, and iterative, undirected exploratory analysis.

SUMMARY OF THE INVENTION

An object of this invention is to provide a pull system (as opposed to a push system where information/services are sent to users/buyers without prior consulting) that allows buyers of bundled services in a given service domain to easily search for, identify, fine tune, and compare relevant offerings without filling out profiles.

Another object of the invention is to allow buyers to propose alternative service bundling to be considered dynamically by service providers via a reverse auction process with buyer specified auction parameters including reserve prices and close times.

A further object of the present invention is to allow buyers to dynamically manage the services mix during delivery based on changes in relevancy and price, and to save and reuse successful service bundles as templates for future buying decisions.

An object of this invention is to allow service providers to easily measure business effectiveness and to identify opportunities for changing prices, increasing capacity or agreeing to bundle offerings with other service providers to improve overall business effectiveness without having to develop and maintain buyer segmentation data.

A further object of this invention is to allow confirmatory analysis, what-if analysis, and iterative, undirected exploratory analysis.

Those and other objectives are attained with a method and system of providing user context-based services over computer networks, using mechanisms for collecting and specifying one or more user context elements, each element representing a context associated with the current buyer state and having context attributes and attribute values associated therewith, mechanisms for collecting affective (emotive) data to inform the user context, and also an interactive graphical view to gain insight into available services for assisting in understanding available service information and making decisions on purchasing.

The preferred embodiment of the invention, described below in detail, provides a number of important advantages because it learns over time and from all buyers without burdening them with completing extensive profiles. The system makes use of extensive user data from historical, contextual and affective sources. This invention provides an end-to-end solution which covers the spectrum of pull activities from purchase decision support through service delivery, provides the buyer with a choice of intuitive interfaces including a graphical interface with visualization for decision support, or an interactive natural language interface. With the permission of individual buyers, the system can be used by service providers to push offers of relevant services packages to buyers. The system is applicable to a variety of service domains which minimizes the learning curve for buyers.

Such a self service system for service enhanced resource delivery is applicable to a variety of service domains including, but not limited to, travel, financial services, real estate and education.

Further benefits and advantages of the invention will become apparent from a consideration of the following detailed description, given with reference to the accompanying drawings, which specify and show preferred embodiments of the invention.

BRIEF DESCRIPTION OF THE DRAWINGS

FIG. 2 illustrates the iconic graphical user interface for the Personal Service Area in Desktop Workspace.

FIG. 5 illustrates the iconic graphical user interface for the User Affective Data Management Workspace.

FIG. 14 provides examples of data elements from the travel services domain, given example user interactions with the self service system for service enhanced resource delivery via the graphical interfaces.

FIG. 15 provides examples of data elements from the education services domain, given example user interactions with the self service system for service enhanced resource delivery via the graphical interfaces.

FIG. 17 illustrates the "Provider Workspace for Pricing, Bundling, Measurements and Evaluation."

DETAILED DESCRIPTION OF THE PREFERRED EMBODIMENTS

Figure 1:
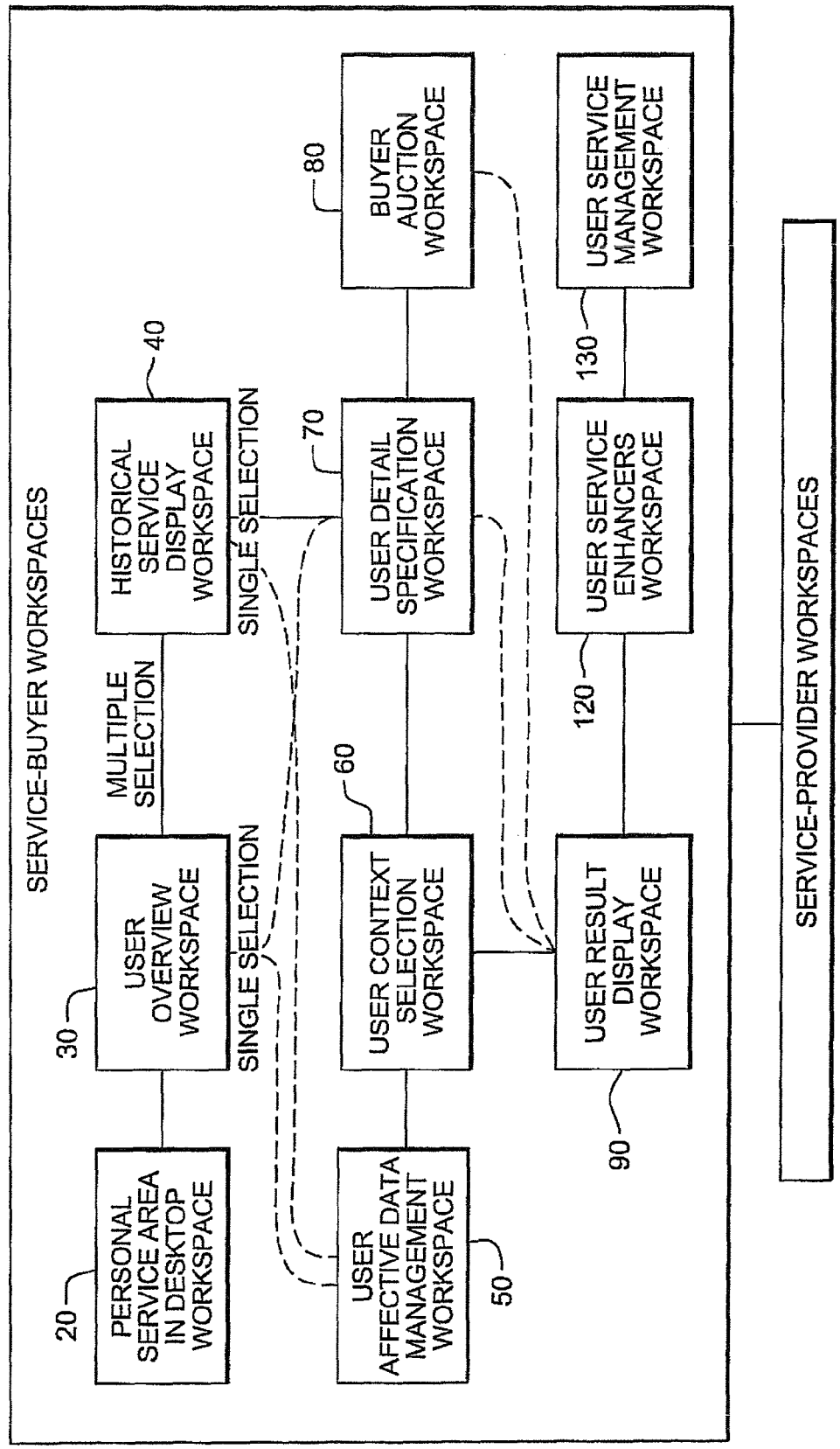
FIG. 1 is a flowchart showing the generic process steps of the service buyer's interaction with the self service system for service enhanced resource delivery through various graphical interfaces.

The present invention, generally, provides a user context based distributed self service system for service enhanced resource delivery. The invention makes use of one or more user context elements, each element representing a context associated with the current buyer state and having context attributes and attribute values associated therewith. This invention enables buyer specification of relevant service selection criteria for enabling expression of relevance of service results in terms of user context, searches a services database, and generates a services response set having services that best match a buyer's query, user context attributes and user defined relevant services selection criteria. The services response sets are presented to the buyer in a manner where the relevance of each of the service bundles is expressed in terms of user context in a manner optimized to facilitate service bundle selection, and enables continued buyer selection and modification of user context attribute values to enable increased specificity and accuracy of a buyer's query to thereby result in improved selection logic and attainment of service bundles best fitted to the query. Adaptive algorithms and supervised and unsupervised learning sub-processes are implemented to enable the self service system for service enhanced resource delivery to learn from each and all buyers and to make that learning operationally benefit all buyers and providers over time.

This invention also preferably uses mechanisms for collecting affective (emotive) data to inform the user context to aid in the buyer's selection and fine tuning of relevant service bundles as well as changes in service configurations during delivery. This data is collected and used with the buyer's permission and guidance. This affective data may include changes in facial expressions, voice and body temperature. Also, this invention preferably uses electronic agent mechanisms for automated or semi-automated negotiations and auctions to change the pricing of specific service bundles for identified user context classifications based on an automated analysis of user interaction records or in response to new service bundles proposed by buyers or providers.

This invention also makes use of a support tool called Absolute which was developed for procurement managers. In this invention, the tool is used for the comparison of service bundles. This tool enables a buyer to select two or more bundles to be visually compared side by side, ranked by their merit on buyer defined relevant services selection criteria, and fine tuned interactively to visually convey the impact of changes in the configuration of a services bundle on the services selection criteria. This tool enables a buyer to compare previously purchased service bundles to select the best bundle to use as a template for the selection of future service bundles.

The Absolute support tool provides a confirmatory analysis capability when working with a multi-attribute decision support mechanism (i.e., the traditional additive model based algorithm for scoring and ranking multi-attribute objects). That is, the scoring algorithm creates hypotheses, i.e., scores and rankings of services, and the buyer can confirm the result by using the intuitive visualization of the tool. Sometimes, the tool even detects and shows facts hidden or not shown in the scoring mechanism.

The Absolute support tool also allows what-if analysis for determining attribute weights for the multi-attribute scoring mechanism. Weight elicitation is the most difficult (because trade-offs among attributes is hard to understand) and important part of any multi-attribute scoring algorithms. In this tool, the buyer can change the weight of one or more attributes in any way and see the effect in the changed visualization and also in the changed scores/rankings, which helps understand and improve the weight determination.

Another difference between other visual decision support tools and the Absolute support tool as used in this invention is that Absolute also enables iterative, undirected, exploratory analysis. For example, the buyer can create hypotheses about multi-attribute services by simply exploring various parts of the visualization or using the similarity search feature. Those hypotheses may be confirmed by using an augmented quantitative analysis mechanism such as the scoring mechanism.

The self service system, and the interaction of the system through the iconic interfaces of the invention, will be described with respect to example domains such as travel and education and will be further described from the point of view of the following users: a traveler and a learner. In describing the user's interaction with the system through the iconic interfaces, the following set of data elements are used in the system: User Affective Data, Previous Service packages, User Query, User Context, Context Attribute, Resource Attribute Value, Value Resource Parameters, Combined Primary Service and Service Enhancers Criteria Values, Service Enhancers, and Service Enhancer Choices.

Figure 3:
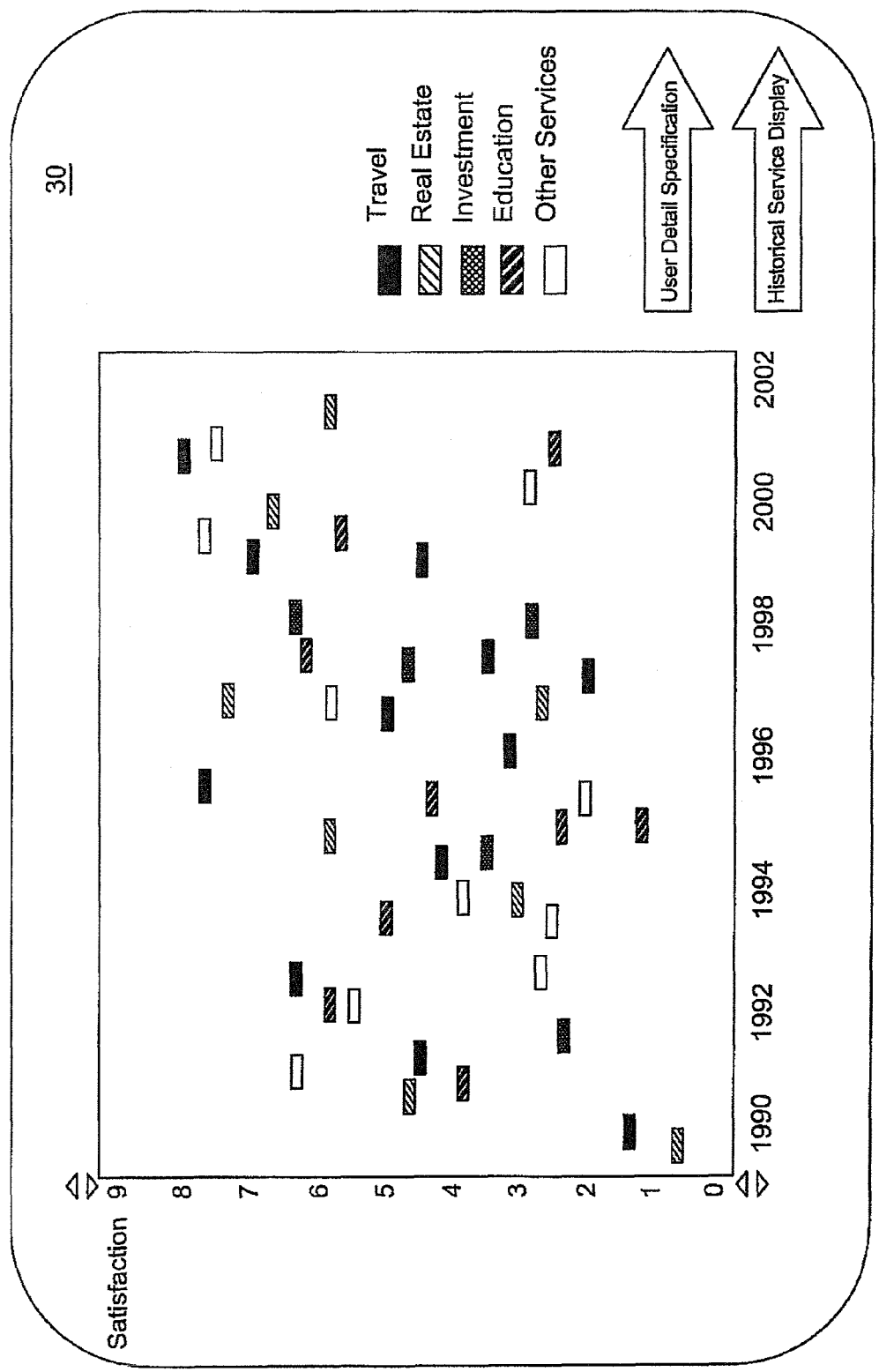
FIG. 3 illustrates the iconic graphical user interface for the User Overview Workspace.

FIG. 1 depicts alternative paths through the ten graphical user interfaces available to the service buyer as part of the end to end solution covering the spectrum of pull activities from purchase decision support throught service delivery. In the first process step, the buyer uses the "Personal Service Area in Desktop Workspace" 20 (shown in FIG. 2) to select the relevant service domain and access the "User Overview Workspace" 30 (as shown in FIG. 3) where a two dimensional plot includes one data point representing each service enhanced resource delivery over the past several years plotted against the user's own satisfaction rating at the conclusion of delivery. The data points are coded to distinguish the different domains in which the user has purchased and executed service enhanced resource delivery—i.e. travel, real estate, investment and education. The User Overview Workspace enables the user to recall if they had previously used and rated a service enhanced resource delivery in the past and if the rating was sufficiently good to cause them to want to use the previous service package as a template for a current service enhanced resource delivery need in the same domain.

If the user had previously used and rated as acceptable more than one service enhanced resource delivery in the same domain and wishes to compare these packages based on combined primary service and service enhancer criteria values to identify which previously used package is closes to the current domain need, they can mouse over to read the names they assigned at the time of use and select several by clicking. The user then accesses the "Historical Service Display Workspace" 40 (shown in FIG. 4) to visually compare the selected previously purchased service bundles. Users can reuse a successful services bundle as a template for future buying decisions. If the user had previously used and rated as acceptable a single service enhanced resource delivery they can select it as a template and bypass the "Historical Service Display Workspace."

The user then accesses the "User Affective Data Management Workspace" 50 shown in FIG. 5, where they select the types of affective data about them to be collected, the relative weighting to give each type of data, and the actions authorized based on changes in the data. This data will be used to inform the user context to aid in the buyer's selection and fine tuning of relevant service bundles as well as to inform the user context to aid in recommending changes in service configurations during service delivery. If the user chooses to bypass this workspace, no affective data will be collected.

Figure 6:
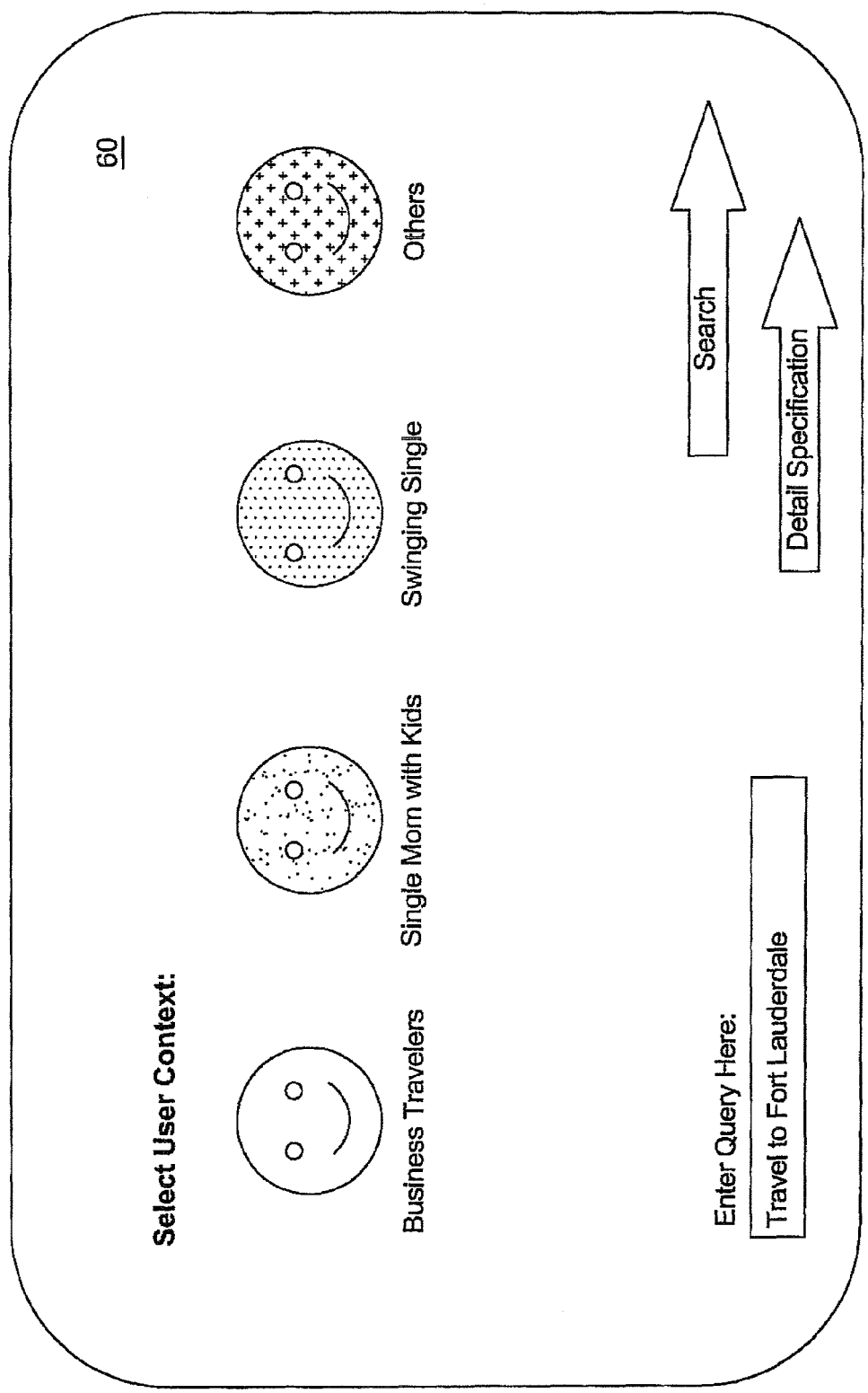
FIG. 6 illustrates the iconic graphical user interface for the User Context Selection Workspace.

The user then accesses the "User Context Selection Workspace" 60 as shown in FIG. 6. The system presents a set of user contexts as icons and will suggest one over the others, but the user may select the one most appropriate to their current situation. The icons presented in this interface each represent a packaging of attribute-value pairs which describe a kind of user in a particular situation. The user then enters a query and will initiate a lookup.

The user then proceeds to the "User Detail Specification Workspace" 70 (FIG. 7), if they want to refine/override search variables included in the selected user context, or they proceed to the "User Results Display Workspace" 90 (FIG. 9) for viewing the search results response set. If they proceed to the "User Detail Specification Workspace" (FIG. 7), the user is able to fine tune or override context attribute values, value resource parameters, and combined primary service and service enhancers criteria and value ranges using a drag and drop interface, iconic pulldowns, and/or slide buttons. The user may return to this screen as many times as needed to find a suitable response set. Particularly, the user context selected on the "User Context Selection Workspace" 60 (FIG. 6) has been made explicit by its default settings on all the iconic interface elements listed.

Alternatively, from the "User Specification Workspace" (FIG. 7) the user can initiate a reverse auction process 80 (FIG. 8) for new services packages developed in real time in response to the criteria and conditions specified by the current settings on the User Detail Specification Workspace (FIG. 7) rather than limiting themselves to searching preexisting services packages.

Figure 10:
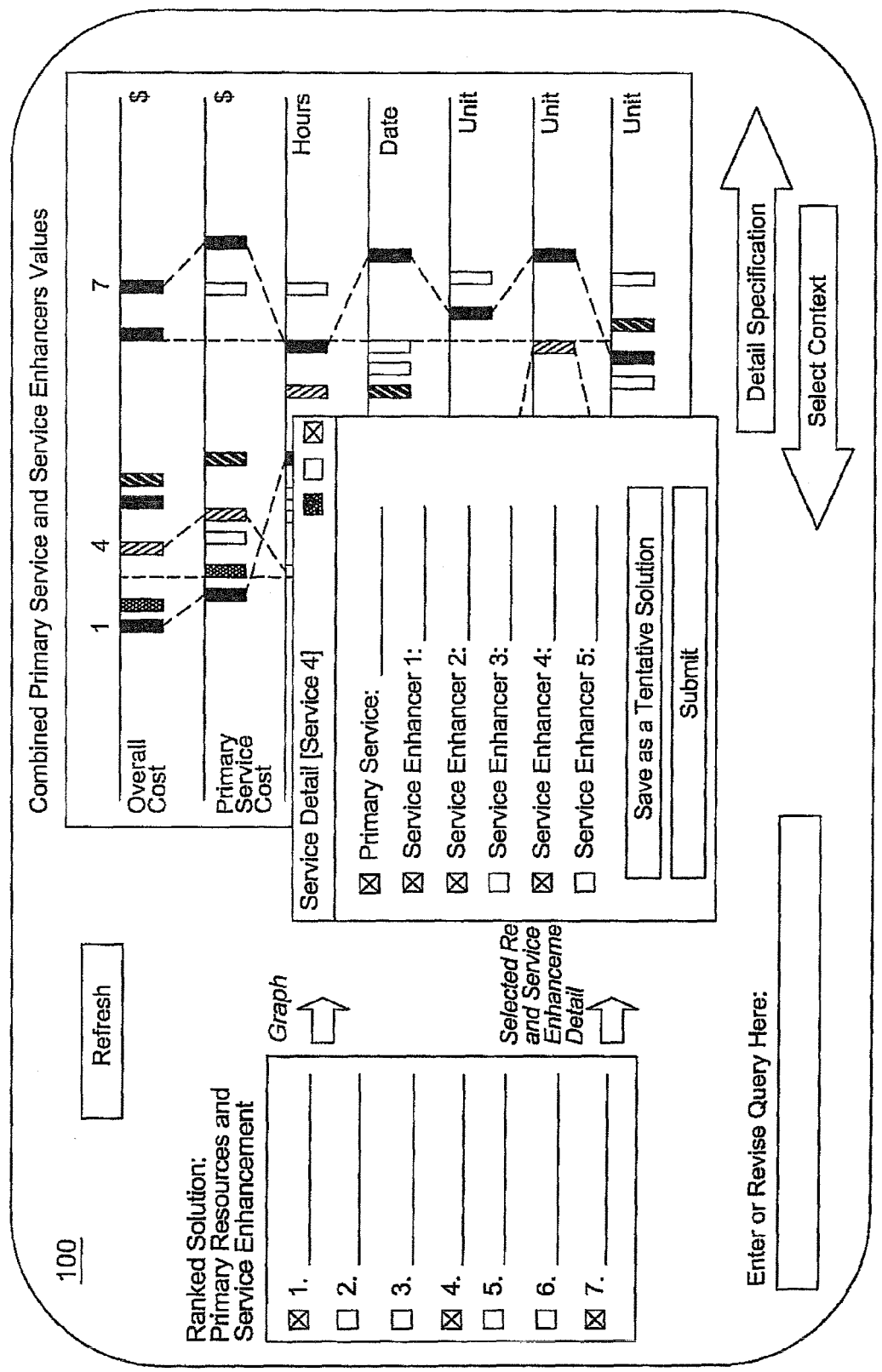
FIG. 10 illustrates the iconic graphical user interface for the User Results Display Workspace showing selection of additional service enhancers.
Figure 11:
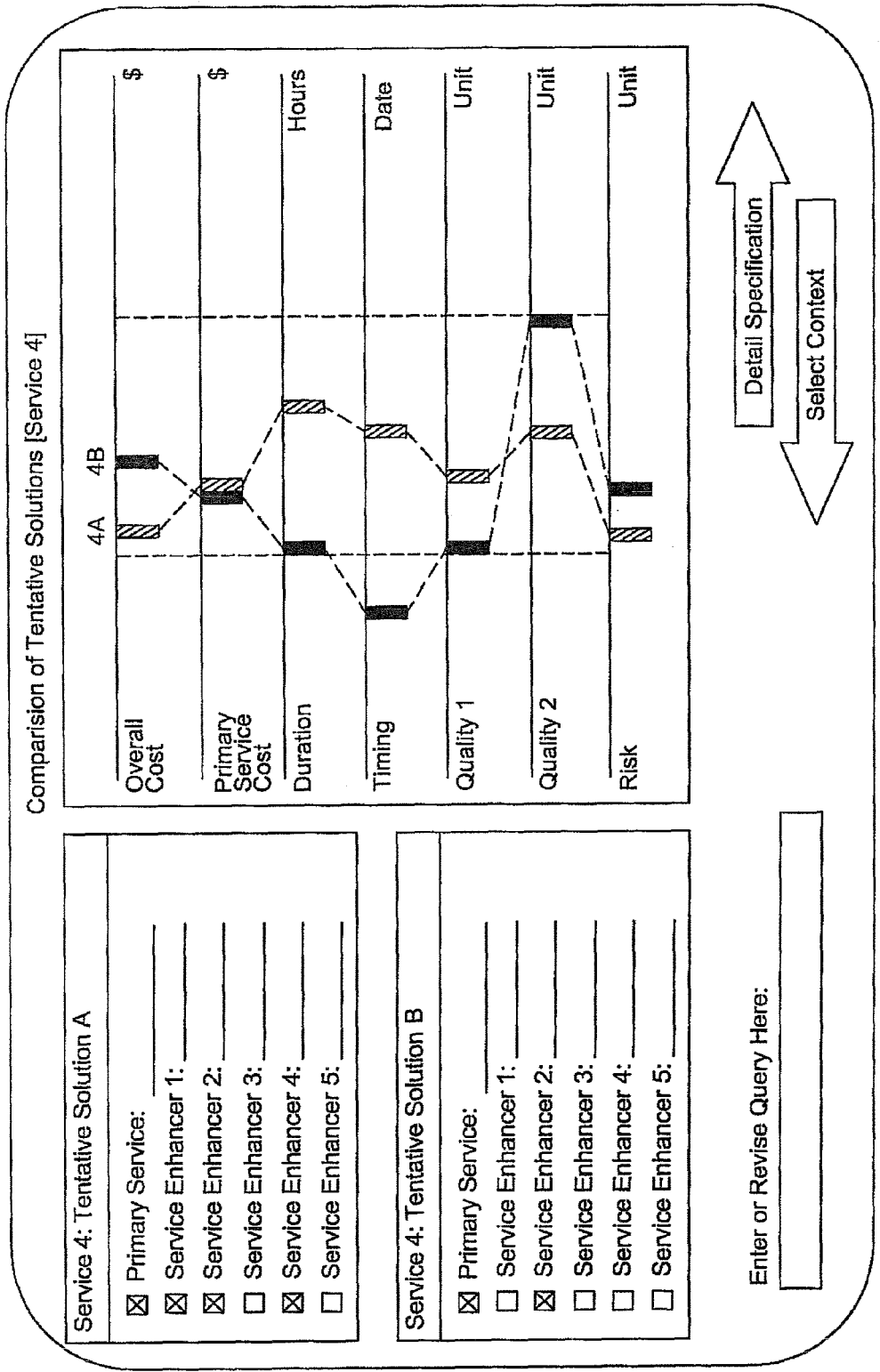
FIG. 11 illustrates the iconic graphical user interface for the User Results Display Workspace showing the comparisons of two service bundles.

When the user proceeds to the "User Results Display Workspace" 90 (FIG. 9), they can visualize N and explore the response set that the system has found to best match the user's initial query and related subject and context variables. This workspace enables the user to continue to learn about the service bundles suggested, select additional service enhancers to add to the bundles, as illustrated at 100 (FIG. 10), and directly compare two alternative service bundles, as illustrated at 110 (FIG. 11), using the Absolute interface, including the option to perform confirmatory analysis, what if analysis and iterative, undirected exploratory analysis of alternative services bundles prior to making a final selection.

Figure 12:
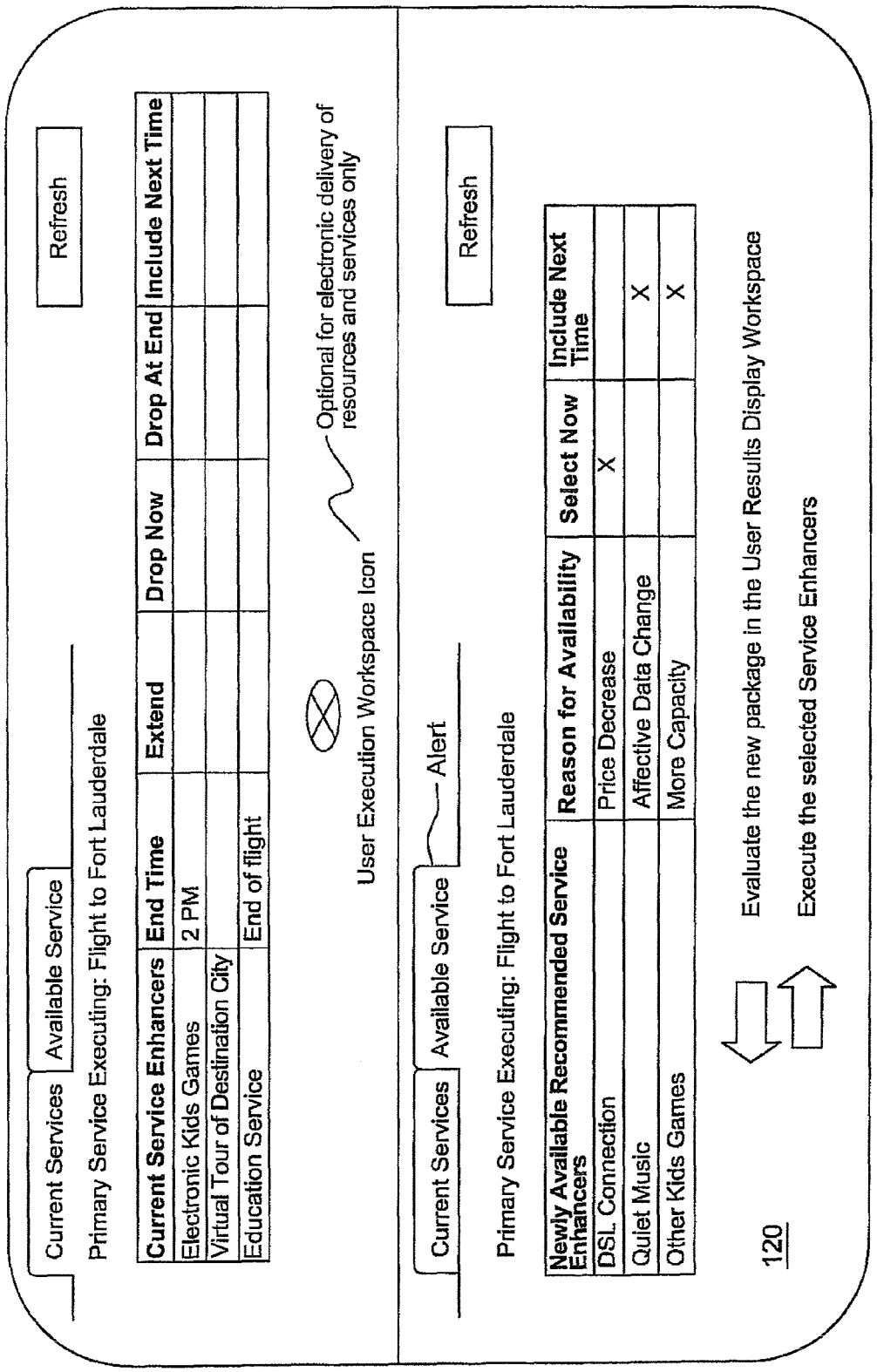
FIG. 12 illustrates the iconic graphical user interface for the User Service Enhancers Management Workspace.
Figure 13:
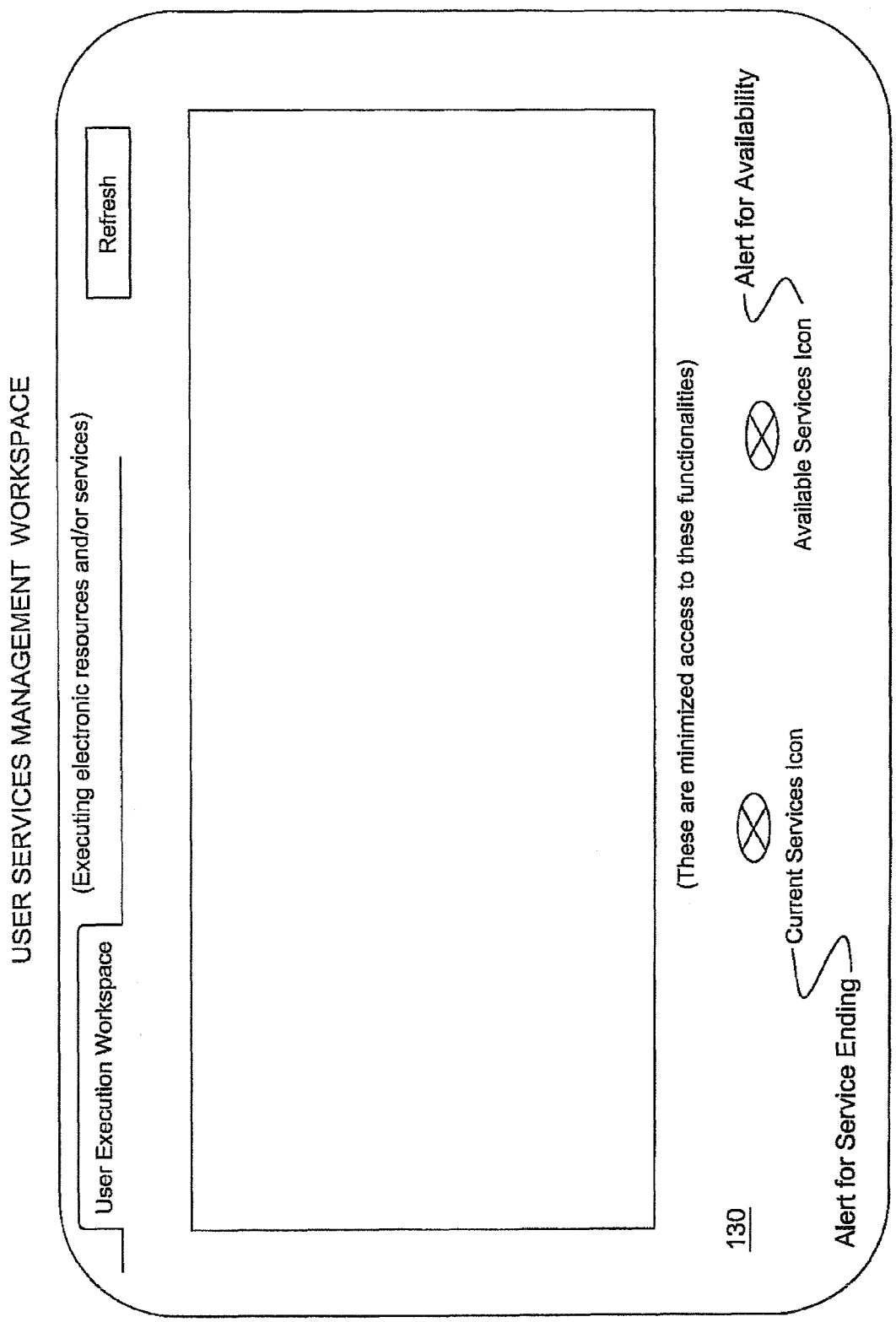
FIG. 13 illustrates the iconic graphical user interface for the User Services Management Workspace.

FIG. 12 shows the "User Service Enhancers Management Workspace" 120 which enables users to dynamically manage the services mix during delivery based on changes in relevancy and price and to save and reuse successful services or entire service bundles as templates for future buying decisions. If the primary service being delivered is electronic in nature (such as an e-learning course vs. a physical service such as an airline flight, FIG. 13 shows at 130 the workspace in which the electronic service is delivered. The minimized Current Services icon and Available Services icon enable the user to access the corresponding graphical user interfaces as shown in FIG. 12.

Figure 16:
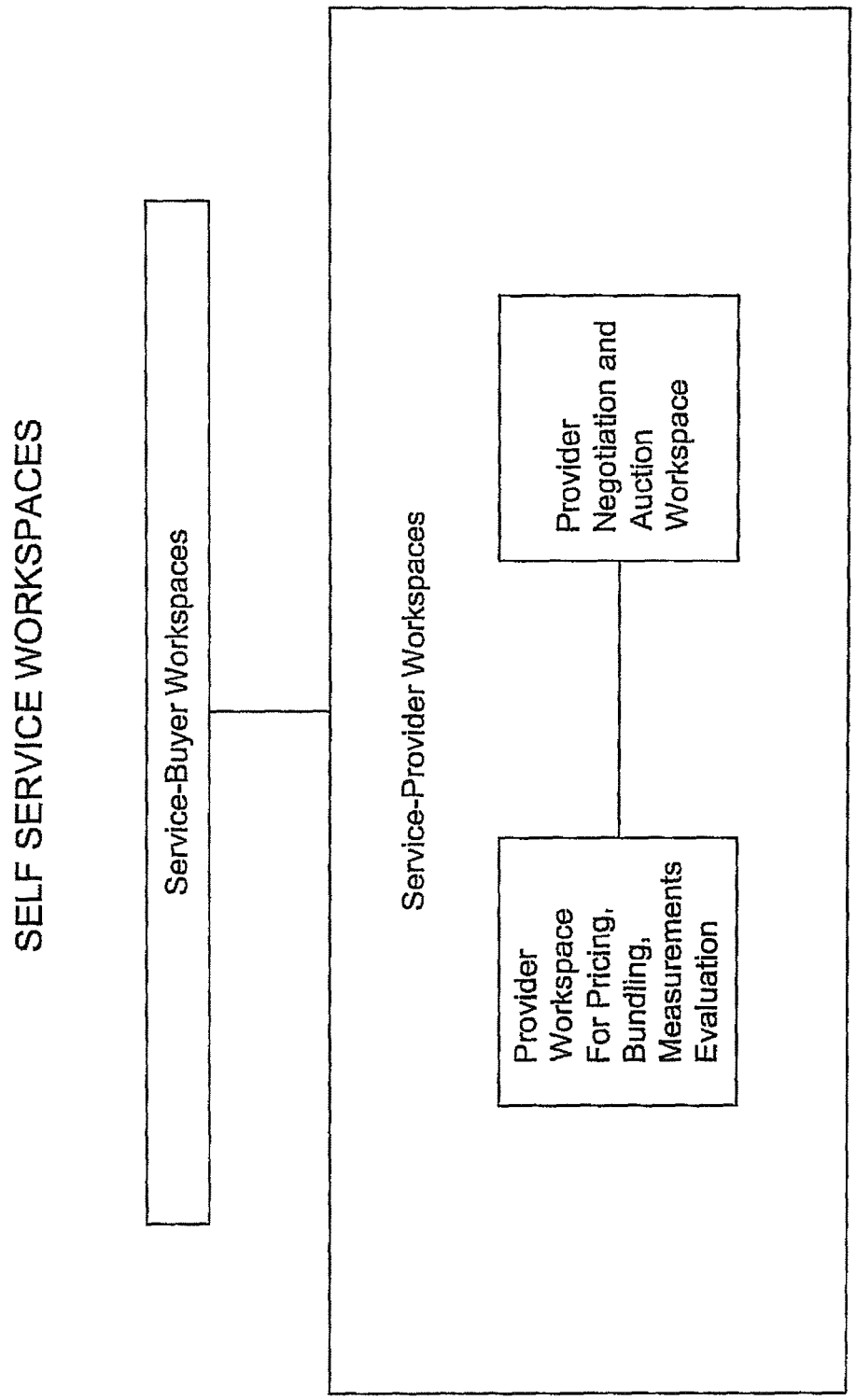
FIG. 16 is a flowchart showing the generic process steps of the service provider's interaction with the self service system for service enhanced resource delivery through various graphical interfaces.
Figure 17:
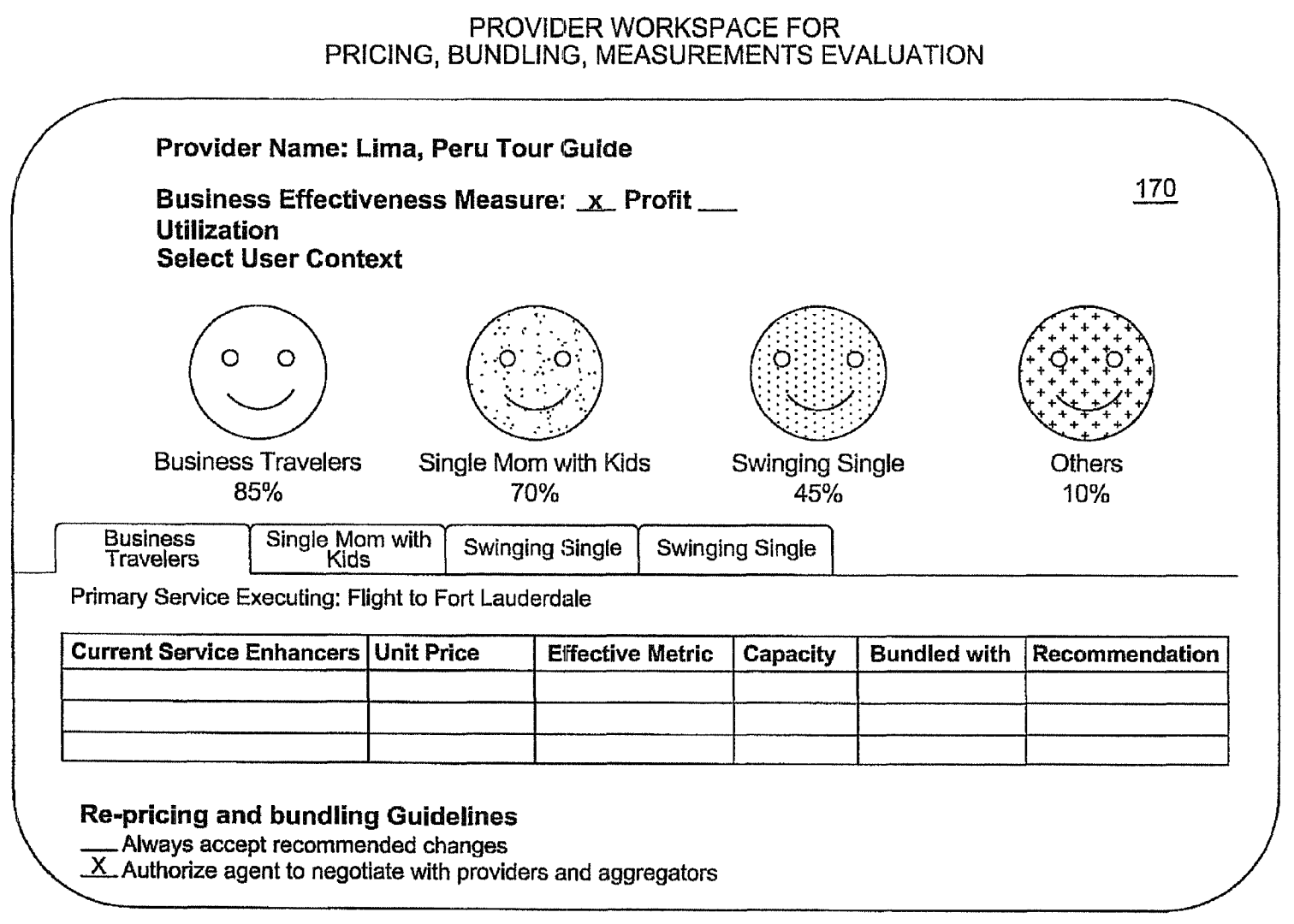

As shown at 160 in FIG. 16, the system includes two iconic interfaces for use by service providers. FIG. 17 shows at 170 the "Provider Workspace for Pricing, Bundling, Measurements and Evaluation" where service providers can set one or more objectives of the effectiveness measurement, select one or more of the contexts of the current user among the given alternatives, and plan and execute the bundling of service enhancers with the selected primary service. For business effectiveness measurement, the system provide one or more basic relevant metrics which the provider can configure the system for. In addition, the provider can define one or more new metrics, and also derive metrics by combining one or more existing measures.

Once a user context is selected for the current user, the provider can view a service enhancer combination page for the selected user context. This page shows all the available service enhancers (along their information such as price and capacity) for the selected primary service. The provider can plan for a bundled service by combining one or more service enhancers presented in this page and see the effect (changes) on the total service price and on the previously selected business effectiveness measures. This page also provides recommendations and guidelines for pricing and bundling of services. The provider can user this workspace before the primary services is actually started for preparing a service package, and also after the primary service is started for adding or changing the given service package in real-time.

Figure 18:
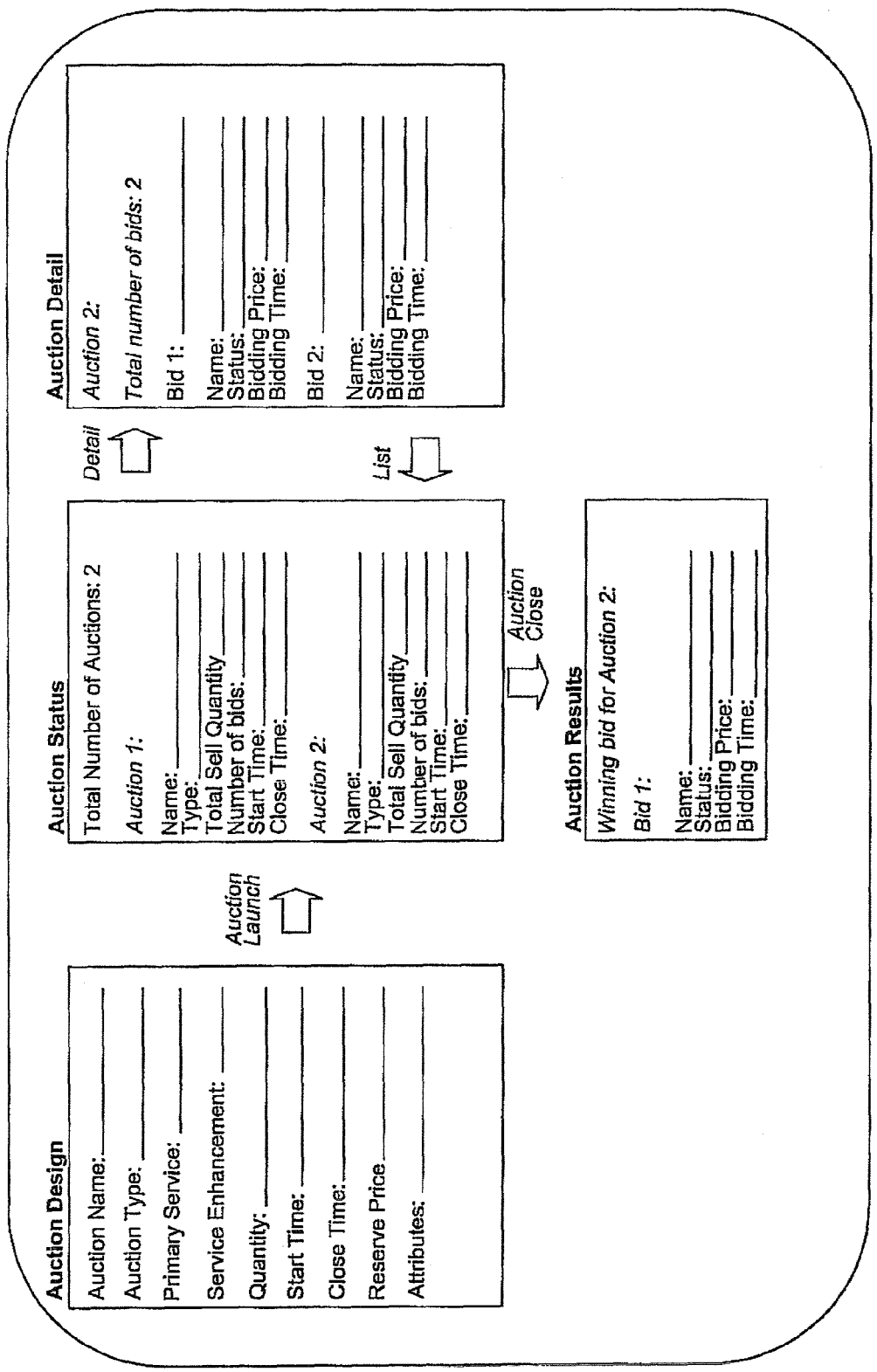
FIG. 18 shows the iconic graphical user interface for the "Provider Negotiations/Auction Workspace."

FIG. 18 shows at 180 the iconic interface for the "Provider Negotiations/Auction Workspace" which can be used for service buyers and providers to negotiate deals on services by using one or more forms of auctions and using computer networks and software programs. Auctions can be initiated by either service providers or buyers. An auction which is initiated by a service provider for selling one or more services is called a forward auction. In contrast, an auction which is initiated by a buyer for purchasing one or more services is called a reverse auction. This Figure will be considered to present a forward auction. As the first step, the initiator of an auction, i.e., a service provider, designs the auction by using the auction design template which is provided by a computer network access software program such as a Web browser. In this form, the auction initiator specifies basic information about the auction such as name, type, the primary service and service enhancers to be purchased, and basic rules on the auction.

Once the auction is defined and launched in a computer network program by a buyer, service providers who are previously registered for the computer network program and granted for using the program can review the detail information of the auction, and also, if they wish, participate in the auction by submitting one or more bids to the auction. In the meantime, the auction initiator, i.e., the buyer can monitor the status of his/her auction while it is accepting bids from providers. When the auction closes, the auction program decides one or more winning bids among the submitted bids based on a certain predefined criterion, such as price or other attributes of the bids.

With respect to the travel domain, the user is a traveler and FIG. 14 depicts an example interaction with the customer self service system through the iconic interfaces (FIG. 1) included in the embodiment of the invention as applied to the travel domain.

The ten iconic workspaces of FIG. 1 enable a traveler to specify data elements, such as the example data elements depicted in FIG. 14, and view results, as follows:

Access to Summary Plot Covering Prior Packages Used in Different Domains

In the first process step, the traveler uses the Personal Service Area in Desktop Workspace (FIG. 2) to access the User Overview Workspace (FIG. 3) where a two dimensional plot includes one data point representing each service enhanced resource delivery over the past several years plotted against the user's own satisfaction rating at the conclusion of delivery. The data points are color coded to distinguish the different domains in which the user has purchased and executed service enhanced resource delivery—i.e. travel, real estate, investment and education. The purpose of the User Overview Workspace is to enable the traveler to recall if they had previously used and rated a service enhanced travel resource delivery in the past and if the rating was sufficiently good to cause them to want to use the previous service package as a template for a current travel service need, although the actual destination of the current trip and the time of the year, as expressed in the query, might differ from that of the previous service package.

A. Case Where No Prior Acceptable Travel Package Is Available for Use as a Model for Current Need 1. Identification of Affective Data Inputs and Uses (optional)

If the traveler has not previously used and rated a service enhanced travel resource delivery or the previous ratings were not considered acceptable, the traveler may elect to go directly to the User Affective Data Management Workspace (FIG. 5), where they select the types of affective data about them to be collected, the relative weighting to give each type of data, and the actions authorized based on changes in the data. This data will be used to inform the user context to aid in the buyer's selection and fine tuning of relevant service bundles as well as to inform the user context to aid in recommending changes in service configurations during service delivery. If the user chooses to bypass this workspace, no affective data will be collected. In this example, as shown in FIG. 14, the traveler elects to give equal weight to changes in voice characteristic and palm sweat and to have the self service system for service enhanced resource delivery recommend real time changes during the selection as well as execution of service enhanced travel resources as will be shown later.

2. Specify Current Query and User Context

Regardless of whether or not the traveler has elected to include affective data in their service enhanced resource selection and execution decisions, the traveler who has elected not to use a previously saved and rated service enhanced resource delivery proceeds to the User Context Selection Workspace (FIG. 6) to specify their query such as "Plan a trip to Vermont in June" for example. The traveler may then select the User Context Icon "Single Mom with kids," for example, from among the available user context icons (where the icon's name is highlighted in FIG. 14). The traveler may then elect to go to the User Detail Specification Workspace (FIG. 7) in order to view the context attributes associated with the "Single Mom with Kids" user context.

Figure 9:
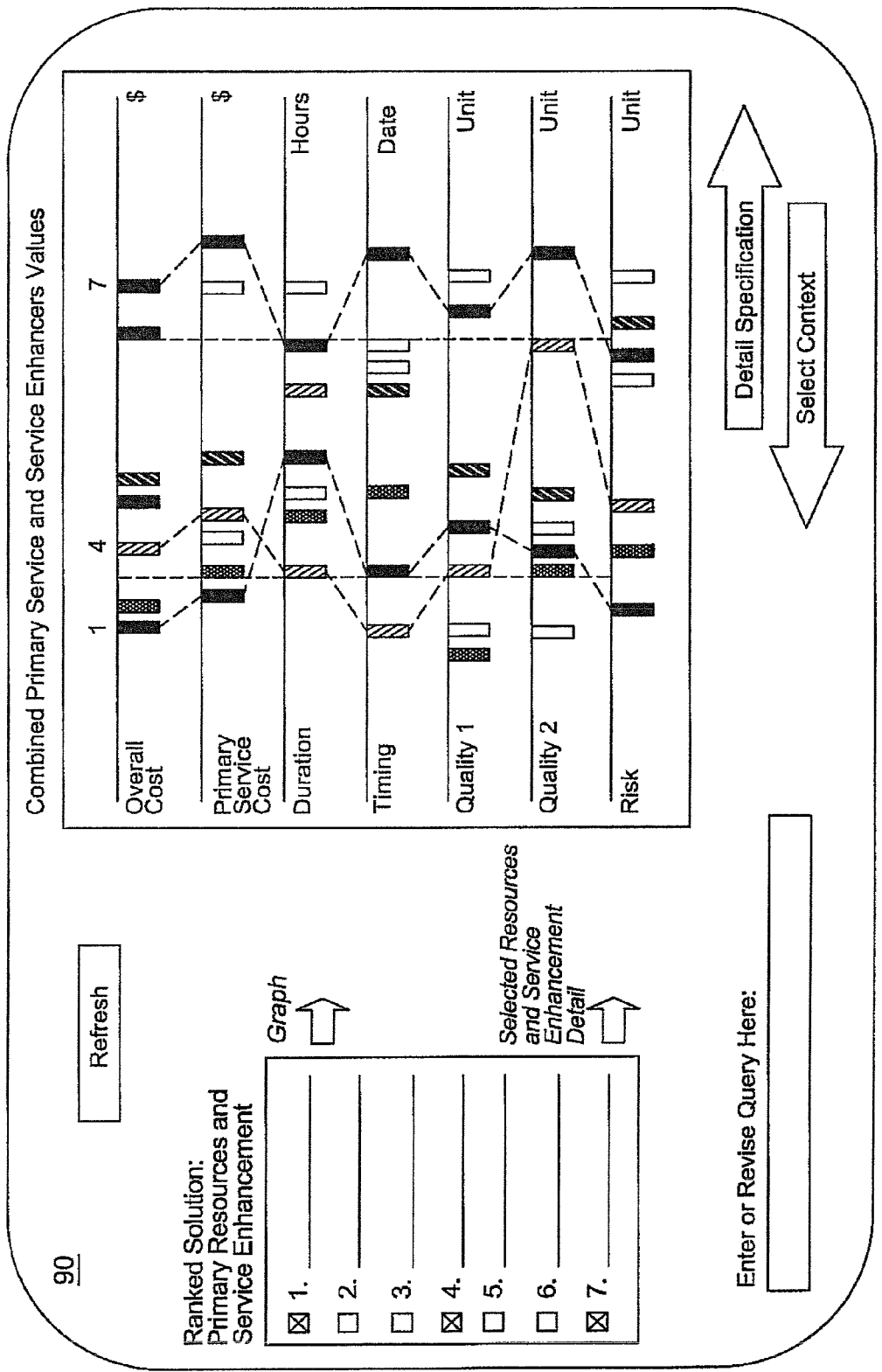
FIG. 9 illustrates the iconic graphical user interface for the User Results Display Workspace showing user-defined selection criteria for multiple bundled service candidates.

Alternatively, the traveler can select the User Context Icon "Single Mom with kids," specify their query "Plan a trip to Vermont in June," and initiate the Search, in which case they will be taken directly to the User Results Display Workspace (FIG. 9).

B. Case Where Acceptable Prior Travel Package(s) are Available for Use as Model(s) for Current Need B1. Single prior package selected for use as a model for current need (includes previous affective data selections so no need to explicitly go to the User Affective Data Management Workspace)

Figure 7:
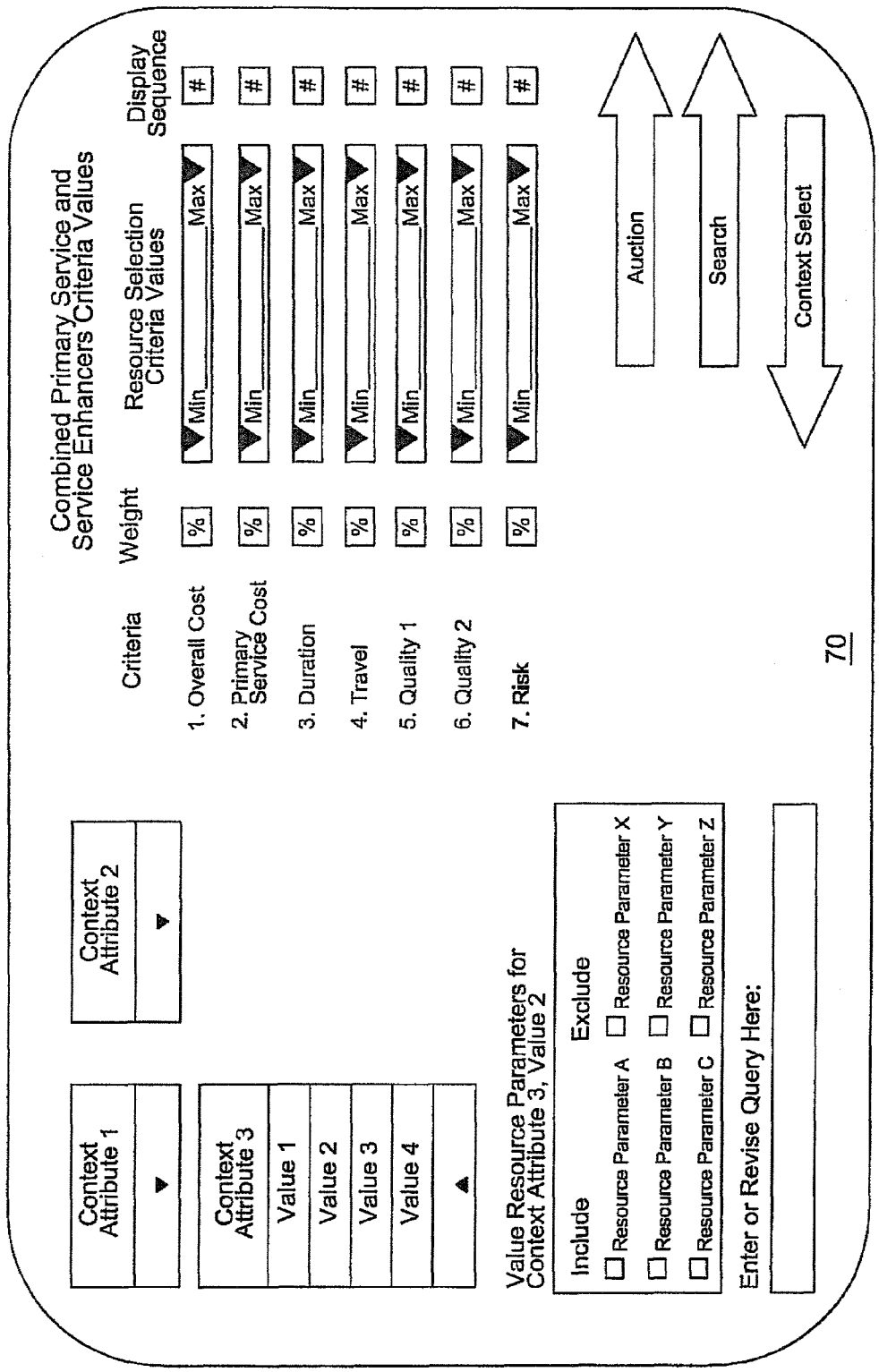
FIG. 7 illustrates the iconic graphical user interface for the User Detail Specification Workspace.
Figure 8:
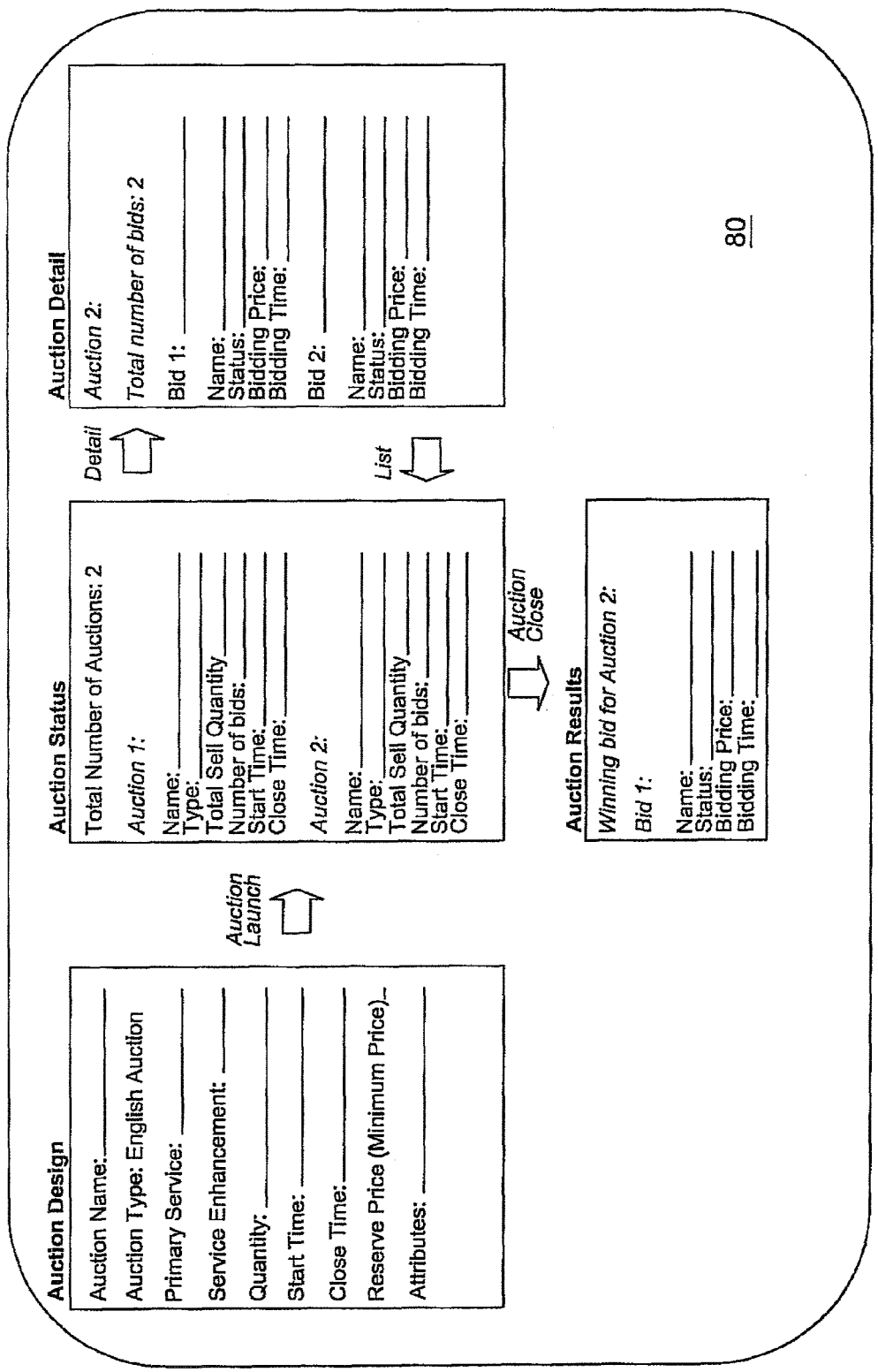
FIG. 8 illustrates the iconic graphical user interface for the Buyer Negotiations/Auction Workspace.

If the traveler had previously used and rated a service enhanced travel resource delivery, as shown on the User Overview Workspace (FIG. 3), and wishes to use the prior services bundle as the basis for a current travel service need, they can mouse over the relevant data point representing the previously used service, i.e. 6/2000 trip to Maine as shown on FIG. 14, select it, and then click on the "User Detail Specification" button to go directly to the User Detail Specification Workspace (FIG. 7). At this workspace the user can fine tune or override the prior service bundle's context attribute values (those associated with a Single Mom with Kids context selected for the previous resource delivery), selected value resource parameters, and combined primary service and service enhancers criteria using a drag and drop interface, iconic pulldowns, and/or slide buttons. Alternatively, the traveler may elect at any time to go to the User Affective Data Management Workspace (FIG. 5), where they can modify previously selected types of affective data about them to be collected, the relative weighting to give each type of data, and the actions authorized based on changes in the data. This updated data will be used to inform the user context to aid in the buyer's current selection and fine tuning of relevant service bundles as well as to inform the user context to aid in recommending changes in service configurations during service delivery and the current selection is finalized.

B2. Several prior packages are identified and compared so one can be selected for use as a model for current need.

Figure 4:
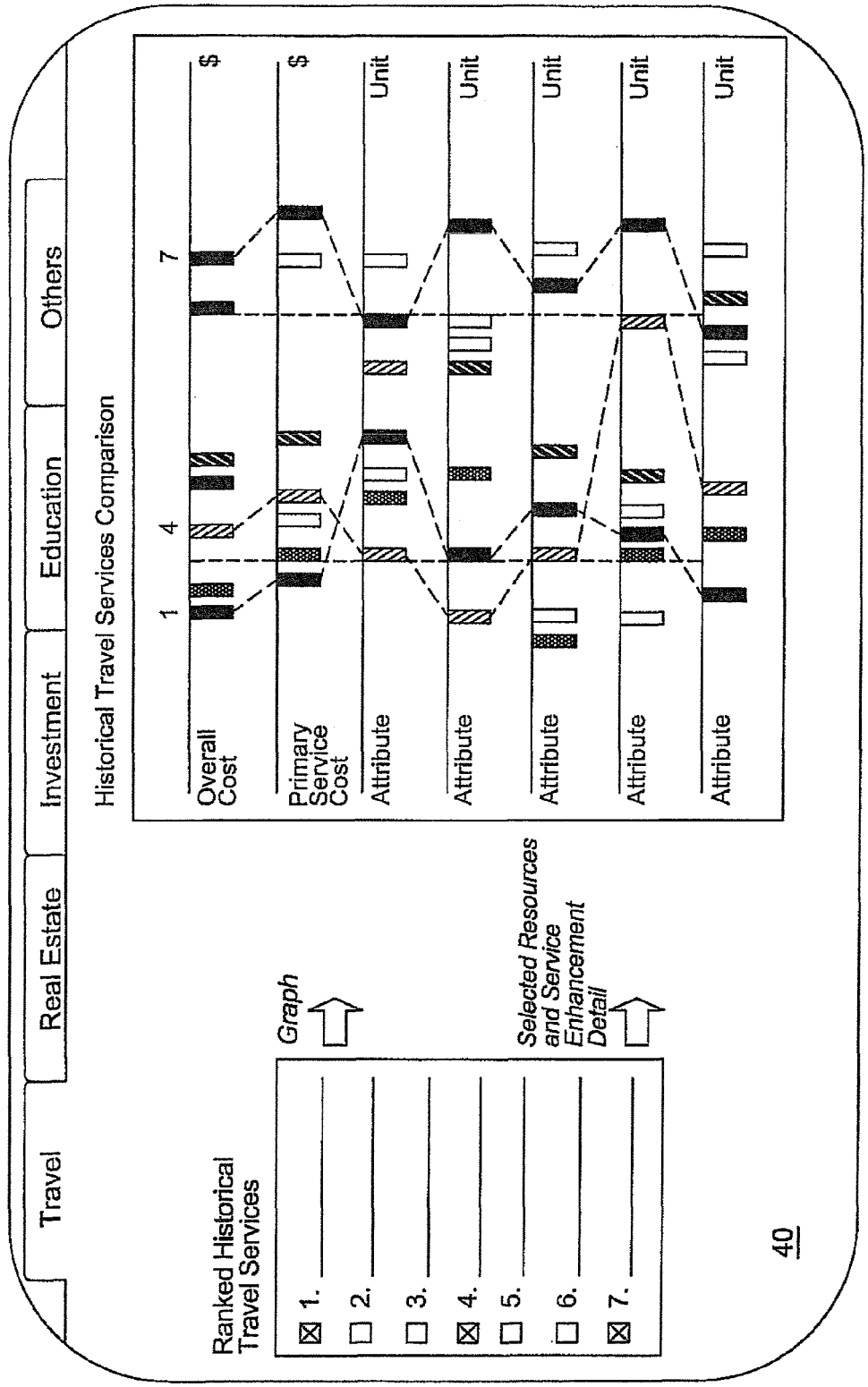
FIG. 4 illustrates the iconic graphical user interface for the Historical Service Display Workspace.

If the traveler had previously used and rated more than one service enhanced travel resource delivery as shown on the User Overview Workspace (FIG. 3) and wishes to compare these packages based on combined primary service and service enhancer criteria values to identify which previously used package is closest to the current travel need, they can mouse over the most highly rated previously used packages to read the names they assigned at the time of use and select one or more before clicking on the link to go to the Historical Service Display Workspace (FIG. 4). In this example, the traveler selects the applicable service domain tab, Travel, to select and visually compare the previously selected purchased travel service bundles, i.e. 3/2001 trip to Vermont, 6/2000 trip to Maine and 4/1999 trip to Colorado as shown in FIG. 14 which are listed in descending order of satisfaction as rated previously by the traveler.

Alternatively, the traveler can make the selections for detailed analysis on the Historical Service Display Workspace once the travel domain tab is selected and all previously used travel service packages are displayed in descending order of user satisfaction. The traveler selects one or more of the packages for a visual comparison by clicking on the Graph button, and the user also has the option of seeing a textual description of the service packages by clicking on the "Selected Resources and Service Enhancement Detail" button. The traveler can connect the data points representing the service enhancer criteria values for a given package by mousing over any of the data points. By clicking on any of the data points, the services package is selected for use as a model for the current travel need and the traveler is taken to the User Detail Specification Workspace (FIG. 7). At this workspace, the user can fine tune or override the selected prior service configuration's context attribute values (such as those associated with a Single Mom with Kids context selected for the previous resource delivery), value resource parameters, and combined primary service and service enhancers criteria using a drag and drop interface, iconic pulldowns, and/or slide buttons.

Alternatively, the traveler may elect at any time to go to the User Affective Data Management Workspace (FIG. 5) where they can modify previously selected types of affective data about them to be collected, the relative weighting to give each type of data, and the actions authorized based on changes in the data. This updated data will be used to inform the user context to aid in the buyer's current selection and fine tuning of relevant service bundles as well as to inform the user context to aid in recommending changes in service configurations during service delivery, and the current selection is finalized.

The traveler may return to the User Detail Specification Workspace (FIG. 7) as many times as needed to find a suitable response set. Particularly, the user context selected on the "User Context Selection Workspace (FIG. 6) or included when the previous service package used as a model was selected, has been made explicit by its default settings on all the iconic interface elements listed.

How the traveler uses the Detail Specification Workspaces to fine tune.

Staying with the travel services example, the three context attributes for the Single Mom with kids context would be Mode of Transportation, Mode of Housing, Food Style and Mode of Transportation, as indicated in FIG. 14. Preferably, the default assigned context attribute value ("Drive," for example) for any context attribute ("Mode of Transportation," for example) is visible on the context attribute icon ("Mode of Transportation," for example, whose name is shown highlighted in FIG. 14 and which is represented by Context Attribute 3 on FIG. 7). In addition, the traveler may click on the context attribute ("Mode of Transportation," to stay with the example) to display a pull down menu to view the other values (in either picture or word format) that could be assigned to this attribute ("Fly," for example). The traveler selects "fly" as an alternative to "drive," as illustrated in FIG. 14. By "overriding" this attribute value and double clicking on it, the list of Value Resource parameters (include/exclude filters) for the attribute value "Fly" is displayed (as represented on FIG. 7 by Value Resource Parameters for Context Attribute 3, Value 2). The traveler may indicate that he/she wants to include all major carriers and exclude prop planes and airlines with bad safety records when searching for relevant service bundles. The traveler may also specify resource priorities by selecting, sequencing and weighting and specifying minimum and maximum values for relevant criteria such as overall cost, primary service cost, duration, timing, quality and risk on the Combined Primary Service and Service Enhancers Criteria Values graphical user interface element on the Detail Specification Workspace.

How a traveler uses the Buyer Negotiations/Auction Workspace to receive bids from travel service providers.

Once the traveler specified the details of the selection criteria for the service (combined primary service and service enhancers) of interest in the User Detail Specification Workspace (FIG. 7), s/he can retrieve zero or more available services meeting the specified criteria via two methods. One is by searching catalogs of services published in the network (e.g., Internet), and the other is by executing one or more auctions over the network. Catalogs of services are often published by travel providers in the network with packages of services with their components and attribute values fixed. A click on the "search" button in the User Detail Specification Workspace (FIG. 7) returns a collection of service packages from those catalogs that meet the selection criteria, and displays them in the User Results Display Workspace (FIG. 9).

Alternatively, a click on the "auction" button in the User Detail Specification Workspace (FIG. 7) starts an auction process that allows the traveler and provider to negotiate on service packages. Instead of using catalogs of services with fixed values, providers can make bids on the submitted selection criteria with service packages that do not have pre-set price or any other attribute values. The process starts with the "Auction Design" by the traveler. In this step, the auction form (FIG. 8) is created by using the values passed from the the User Detail Specification Workspace (FIG. 7). Also, the traveler specifies values for certain attributes related to auction management, e.g., start time, close time, reserve price. Once the auction form is created, the traveler launches the auction by clicking on the "Auction Launch" button in the workspace.

Once the auction is launched in the network, the traveler and travel providers can view the auction request in the workspace, and submit one or more bids. User of the auction workspace, i.e., travelers and travel providers (potential bidders) can review the information on auctions launched in this site in the "Auction Status" workspace. If desired, a traveler or a travel provider can review detail information on an auction, e.g., the number of submitted bids and their details, in the "Auction Detail" workspace. Providers, i.e., bidders may want to use this information before and after making their bids. Also, the traveler (the auction launcher) may want to review this information to check its status. After some time, when the auction close criterion is met (e.g., the close time specified in the "Auction Design" workspace), the auction engine parses all the submitted bids and decided on one or more winning bids among them. If the winning bids are multiple or if the traveler desires, they may be displayed in the User Results Display Workspace (FIG. 9) for further review.

The traveler may return as many times as necessary to select a different user context (Swinging Single, for example) on the User Context Selection Workspace before proceeding with a Search. They can also initiate a reverse auction process for new services packages developed in real time in response to the criteria and conditions specified by the current settings on the User Detail Specification Workspace rather than limiting themselves to searching for preexisting services packages.

How the traveler uses the Results Display Workspace to compare packages, enhance them and make a final selection.

If the traveler decides to initiate a search for preexisting services packages, they are taken to the User Results Display Workspaces (FIGS. 9, 10, and 11), where they can visualize and explore the service packages response set that the system has found to best match the traveler's initial query and related subject and context variables. These workspaces enable the buyer to continue to learn about the travel services bundles suggested (FIG. 9), to select additional service enhancers to add to the travel service bundles (FIG. 10) and to directly compare two alternative service bundles using the Absolute graphical user interface, where they have the option to perform confirmatory analysis, what if analysis and iterative, undirected exploratory analysis of alternative service bundles prior to making a final selection. With more particularity, the traveler selects three (nos. 1, 4 and 7) from among the seven travel services packages returned by the Search for the purpose of visually comparing them by their scores on the Combined Service and Service Enhancers Criteria Values selected on the User Detail Specification Workspace. The buyer then mouses over Package 4 and clicks on "Selected Resource and Service Enhancement Detail" to display a list of included service enhancers as shown on FIG. 10. The traveler decides to save two tentative solutions based on Package 4, one including all four available service enhancers and one with only two, as shown on FIG. 11. The four included service enhancers would be Beverage, Music, Electronic games and Electronic mail as shown on FIG. 14. For each, the traveler would select a service enhancer choice (Beer for Beverage, for example) and then directly compare the two alternative service solutions from the perspective of their Combined Primary Service and Service Enhancers Criteria Values as shown on FIG. 11.

If no acceptable travel services bundles were provided, the traveler may return to the Context Selection Workspace to redefine their query or select a different user context such as "Swinging Singles." The traveler may also elect to return to the Detail Specification Workspace to change the default value of the context attribute "Mode of Transportation" from Fly to Train and add or remove Value Resource Parameters for the attribute value Train or other context attribute values associated with context attributes such as "Mode of Housing" or "Food Style." The traveler may also change their combined primary service enhancers selection criteria, the weighting of the selection criteria, and the minimum/maximum values for any selection criteria, in hopes of identifying additional relevant resources.

Once the traveler has selected a travel services bundle by double clicking on any data point on the graph of that travel service bundle on the User Results Display Workspace, they are taken to the User Service Enhancers Management Workspace (FIG. 12) if the execution of the travel services bundle is to begin immediately, or they are returned to it at the point in the future when they are actually taking the trip.

During the execution of their travel package, the traveler manages their mix of current service enhancers and has access to additional potential service enhancers by using the User Service Enhancers Management Workspace (FIG. 12).

At any time during the execution of the current services the traveler can terminate their execution by clicking on the "Drop Now" button or extend them beyond their scheduled end time by entering a new time in the Extend column. The traveler can also indicate that they want the service enhancer included when they access this saved travel package from the User Overview Workspace (FIG. 3) or Historical Service Display Workspace (FIG. 4) for purposes of using it as a template for a future travel need.

If some new relevant service enhancers, for example movies, become available during the execution of the travel package due to changes in price or availability of the service enhancers or due to changes in the traveler's affective data, the Refresh button on FIG. 12 will flash, giving the traveler the option to click on it to have the list of available services updated. If the traveler then decides to add a service enhancer, they click in the Select Now column and then on the button "Execute the selected Service Enhancers." Alternatively, they can elect to include this new service enhancer during their next trip and it will be saved as part of the travel package.

In the example of travel, the primary resource is a physical resource (i.e. flight) but some or all of the service enhancers can be delivered electronically. In that case, the traveler clicks on the button "User Execution Workspace Icon" on the User Service Enhancers Management Workspace (FIG. 12) to be taken to the User Services Management Workspace (FIG. 13), where the electronic service enhancers (i.e. email and electronic games as indicated in FIG. 14) are delivered. At any time the traveler can review their current services by clicking on the Current Services Icon and review available service enhancers by clicking on the Available Services Icon as indicated on FIG. 13. Both of these icons will flash to alert the traveler to conditions such as a current service ending or the availability of additional service enhancers.

How a travel provider uses the Provider Workspace for Pricing, Bundling, and Measurements Evaluation to manage service information.

The Provider Workspace for Pricing, Bundling and Measurements Evaluation (FIG. 17) is where a travel provider can manage and control the detail execution of the business, by setting one or more parameters for business effectiveness measurement, selecting one or more user contexts, setting values for detail attributes of services and service enhancers for the selected user context, and selecting criteria for pricing and bundling guidelines. In this console, the travel provider can review details of services and service enhancers provided to each user context. For each service or service enhancer, the travel provider can review/modify the values of various attributes, including the unit price, effective metric, capacity, bundling partners, and recommendation schemes.

How a travel provider uses the Provider Negotiations/Auction Workspace to receive bids on component services from its suppliers The task of a travel provider is aggregating (bundling) one or more services and service enhancers from various suppliers, managing the information on those collected services and service enhancers by using the Provider Workspace for Pricing, Bundling, and Measurement Evaluation workspace (FIG. 17), and selling the service package by using catalog publication or auctions. Travel providers employ the Provider Negotiation/Auction Workspace (FIG. 18) for performing the last task, i.e., bundling one or more services and service enhancers from various suppliers, by using auctions. This process starts with the "Auction Design." The travel provider brings up an auction form template and fills out the template to create a new auction. The auction form requires the specification of some attributes related to the auction management, e.g., start and close time, and reserve price. For creating bundled services by aggregating primary services and various service enhancers, the travel provider usually creates an auction that procures multiple services/products at a time, instead of one service/product at a time. Such auctions are often referred to as "bundle auction" or "combinatorial auction." Once the auction form is created, the travel provider launches the auction by clicking on the "Auction Launch" button in the workspace.

Once the auction is launched in the network, the travel provider (the owner of the auction) and its suppliers (potential bidders) can view the auction request in the workspace, and suppliers can submit one or more bids to it. Users of this auction workspace, i.e., traveler providers and their suppliers (potential bidders) can review the information on auctions launched in this site in the "Auction Status" workspace. If desired, a traveler provider or a supplier can review detail information on an auction, e.g., the number of submitted bids and their details, in the "Auction Detail" workspace. Suppliers, i.e., bidders may want to use this information before and after making their bids. Also, the travel provider (the auction owner) may want to review this information to check its status. After some time, when the auction close criterion is met (e.g., the close time specified in the "Auction Design" workspace), the auction engine parses all the submitted bids and decides on one or more winning bids among them. The suppliers of the winning bids will have contracts with the travel provider, and the services and service enhancers of the winning bids will be recorded and managed in the Provider Workspace for Pricing, Bundling, Measurements Evaluation (FIG. 17).

With respect to the education domain, the user is a learner and FIG. 15 depicts an example interaction with the customer self service system through the iconic interfaces (FIG. 1) included in the embodiment of the invention as applied to the education domain. The ten iconic workspaces of FIG. 1 enable a learner to specify data elements, such as the example data elements depicted in the Education Services column 2 of FIG. 15, and view results, as follows:

The ten ionic interfaces of FIG. 1 enable a learner to specify data elements, such as the example data elements depicted in FIG. 15, and view results, as follows.

Access to Summary Plot Covering Prior Packages Used in Different Domains

In the first process step, the learner uses the Personal Service Area in Desktop Workspace (FIG. 2) to access the User Overview Workspace (FIG. 3) where a two dimensional plot includes one data point representing each service enhanced resource delivery over the past several years plotted against the user's own satisfaction rating at the conclusion of delivery. The data points are coded to distinguish the different domains in which the user has purchased and executed service enhanced resource delivery—i.e. travel, real estate, investment and education. The purpose of the User Overview Workspace is to enable the learner to recall if they had previously used and rated a service enhanced education resource delivery in the past and if the rating was sufficiently good to cause them to want to use the previous service package as a template for a current education service need, although the actual education goal and learning conditions, as expressed in the query, might differ from that of the previous education service package.

A. Case Where No Prior Acceptable Education Package Is Available for Use as a Model for Current Need 1. Identification of Affective Data Inputs and Uses (optional)

If the learner has not previously used and rated a service enhanced education resource delivery or the previous ratings were not considered acceptable, the learner may elect to go directly to the User Affective Data Management Workspace (FIG. 5), where they select the types of affective data about them to be collected, the relative weighting to give each type of data, and the actions authorized based on changes in the data. This data will be used to inform the user context to aid in the buyer's selection and fine tuning of relevant service bundles as well as to inform the user context to aid in recommending changes in service configurations during service delivery. If the user chooses to bypass this workspace no affective data will be collected. In this example, as shown in FIG. 15, the learner elects to give equal weight to changes in voice characteristic and palm sweat and to have the self service system for service enhanced resource delivery recommend real time changes during the selection as well as execution of service enhanced education resources as will be shown later.

2. Specify Current Query and User Context

Regardless of whether or not the learner has elected to include affective data in their service enhanced resource selection and execution decisions, the learner who has elected not to use a previously saved and rated service enhanced education resource delivery proceeds to the User Context Selection Workspace (FIG. 6) to specify their query such as "Learn Linux development by distance learning" for example. The learner may then select the User Context Icon "Traveling Consultant," for example, from among the available user context icons (where the icon's name is highlighted in FIG. 15). The learner may then elect to go to the User Detail Specification Workspace (FIG. 7) in order to view the context attributes associated with the "Traveling Consultant" user context. Alternatively, the learner can select the User Context Icon "Traveling Consultant", specify their query "Learn Linux development by distance learning", and initiate the Search, in which case they will be taken directly to the User Results Display Workspace (FIG. 9).

B. Case Where Acceptable Prior Education Package(s) are Available for Use as Model(s) for Current Need B1. Single prior package selected for use as a model for current need (includes previous affective data selections so no need to explicitly go to the User Affective Data Management Workspace)

If the learner had previously used and rated a service enhanced education resource delivery, as shown on the User Overview Workspace (FIG. 3), and wishes to use the prior services bundle as the basis for a current education service need, they can mouse over the relevant data point representing the previously used service, i.e. Learn stereo design by distance learning, as shown on FIG. 15, select it, and then click on the "User Detail Specification" button to go directly to the User Detail Specification Workspace (FIG.7). At this workspace, the user can fine tune or override the prior service bundle's context attribute values (those associated with a Traveling Consultant context selected for the previous resource delivery), selected value resource parameters, and combined primary service and service enhancers criteria using a drag and drop interface, iconic pulldowns, and/or slide buttons. Alternatively, the learner may elect at any time to go to the User Affective Data Management Workspace (FIG. 5), where they can modify previously selected types of affective data about them to be collected, the relative weighting to give each type of data, and the actions authorized based on changes in the data. This updated data will be used to inform the user context to aid in the buyer's current selection and fine tuning of relevant service bundles as well as to inform the user context to aid in recommending changes in service configurations during service delivery and the current selection is finalized.

B2. Several prior packages are identified and compared so one can be selected for use as a model for current need.

If the learner had previously used and rated more than one service enhanced education resource delivery as shown on the User Overview Workspace (FIG. 3) and wishes to compare these packages based on combined primary service and service enhancer criteria values to identify which previously used package is closest to the current education need, they can mouse over the most highly rated previously used packages to read the names they assigned at the time of use and select one or more before clicking on the link to go to the Historical Service Display Workspace (FIG. 4). In this example, the traveler selects the applicable service domain tab, Education, to select and visually compare the previously selected purchased education service bundles, i.e. learn stereo design by distance learning, learn C++ by self study, and learn Java by taking classes as shown in FIG. 15 which are listed in descending order of satisfaction as rated previously by the learner.

Alternatively, the learner can make the selections for detailed analysis on the Historical Service Display Workspace once the education domain tab is selected and all previously used education service packages are displayed in descending order of user satisfaction. The learner selects one or more of the packages for a visual comparison by clicking on the Graph button, and the user also has the option of seeing a textual description of the service packages by clicking on the "Selected Resources and Service Enhancement Detail" button. The learner can connect the data points representing the service enhancer criteria values for a given package by mousing over any of the data points. By clicking on any of the data points, the services package is selected for use as a model for the current education need, and the learner is taken to the User Detail Specification Workspace (FIG. 7). At this Workspace, the user can fine tune or override the selected prior service configuration's context attribute values (such as those associated with a Traveling Consultant context selected for the previous resource delivery), value resource parameters, and combined primary service and service enhancers criteria using a drag and drop interface, iconic pulldowns, and/or slide buttons.

Alternatively, the learner may elect at any time to go to the User Affective Data Management Workspace (FIG. 5) where they can modify previously selected types of affective data about them to be collected, the relative weighting to give each type of data, and the actions authorized based on changes in the data. This updated data will be used to inform the user context to aid in the buyer's current selection and fine tuning of relevant service bundles as well as to inform the user context to aid in recommending changes in service configurations during service delivery, and the current selection is finalized.

The learner may return to the User Detail Specification Workspace (FIG. 7) as many times as needed to find a suitable response set. Particularly, the user context selected on the "User Context Selection Workspace (FIG. 6) or included when the previous service package used as a model was selected, has been made explicit by its default settings on all the iconic interface elements listed.

How the learner uses the Detail Specification Workspaces to fine tune.

Staying with the education services example, the three context attributes for the Traveling Consultant context would be Connectivity, Mentoring Method, and Self Study Method, as indicated in FIG. 15. Preferably, the default assigned context attribute value ("Email," for example) for any context attribute ("Mentoring Method," for example) is visible on the context attribute icon ("Mentoring Method," for example, whose name is shown in FIG. 15 and which is represented by Context Attribute 3 on FIG. 7). In addition, the learner may click on the context attribute ("Mentoring Method," to stay with the example) to display a pull down menu to view the other values (in either picture or word format) that could be assigned to this attribute ("Text Chat," for example). The learner selects "Text Chat" as an alternative to "Email," as illustrated with highlighting in FIG. 15. By "overriding" this attribute value and double clicking on it, the list of Value Resource parameters (include/exclude filters) for the attribute value "Text Chat" is displayed (as represented on FIG. 7 by Value Resource Parameters for Context Attribute 3, Value 2). The learner may indicate that he/she wants to include all licensed Linux education providers and exclude mentors without business experience and mentors with poor quality ratings when searching for relevant service bundles. The learner may also specify resource priorities by selecting, sequencing and weighting and specifying minimum and maximum values for relevant criteria such as overall cost, primary service cost, duration, timing, quality and risk on the Combined Primary Service and Service Enhancers Criteria Values graphical user interface element on the Detail Specification Workspace.

How a learner uses the Buyer Negotiation/Auction Workspace to receive bids from education service providers.

Once the learner specified the details of the selection criteria for the service (combined primary service and service enhancers) of interest in the User Detail Specification Workspace (FIG. 7), s/he can retrieve zero or more available services meeting the specified criteria via two methods. One is by searching catalogs of services published in the network (e.g., Internet), and the other is by executing one or more auctions over the network. Catalogs of services are often published by education providers in the network with packages of services with their components and attribute values fixed. A click on the "search" button in the User Detail Specification Workspace (FIG. 7) returns a collection of service packages from those catalogs that meet the selection criteria, and displays them in the User Results Display Workspace (FIG. 9).

Alternatively, a click on the "auction" button in the User Detail Specification Workspace (FIG. 7) starts an auction process that allows the learner and provider to negotiate on service packages. Instead of using catalogs of services with fixed values, providers can make bids on the submitted selection criteria with service packages that do not have pre-set price or any other attribute values. The process starts with the "Auction Design" by the learner. In this step, the auction form (FIG. 8) is created by using the values passed from the User Detail Specification Workspace (FIG. 7). Also, the learner specifies values for certain attributes related to auction management, e.g., start time, close time, reserve price. Once the auction form is created, the learner launches the auction by clicking on the "Auction Launch" button in the workspace.

Once the auction is launched in the network, the learner and education providers can view the auction request in the workspace, and submit one or more bids. User of the auction workspace, i.e., learners and education providers (potential bidders) can review the information on auctions launched in this site in the "Auction Status" workspace. If desired, a learner or an education provider can review detail information on an auction, e.g., the number of submitted bids and their details, in the "Auction Detail" workspace. Providers, i.e., bidders may want to use this information before and after making their bids. Also, the learner (the auction launcher) may want to review this information to check its status. After some time, when the auction close criterion is met (e.g., the close time specified in the "Auction Deign" workspace), the auction engine parses all the submitted bids and decided on one or more winning bids among them. If the winning bids are multiple or if the learner desires, they may be displayed in the User Results Display Workspace (FIG. 9) for further review.

The learner may return as many times as necessary to select a different user context (Commuting Techie, for example) on the User Context Selection Workspace before proceeding with a Search. They can also initiate a reverse auction process for new services packages developed in real time in response to the criteria and conditions specified by the current settings on the User Detail Specification Workspace rather than limiting themselves to searching for preexisting services packages.

How learner uses the Results Display Workspace to compare packages, enhance them and make a final selection.

If the learner decides to initiate a search for preexisting services packages, they are taken to the User Results Display Workspaces (FIGS. 9, 10, and 11) where they can visualize and explore the service packages response set that the system has found to best match the learner's initial query and related subject and context variables. These workspaces enable the buyer to continue to learn about the education services bundles suggested (FIG. 9), to select additional service enhancers to add to the education service bundles (FIG. 10) and to directly compare two alternative service bundles using the Absolute graphical user interface, where they have the option to perform confirmatory analysis, what if analysis and iterative, undirected exploratory analysis of alternative service bundles prior to making a final selection. With more particularity, the learner selects three (nos. 1, 4 and 7) from among the seven education services packages returned by the Search for the purpose of visually comparing them by their scores on the Combined Service and Service Enhancers Criteria Values selected on the User Detail Specification Workspace. The buyer then mouses over Package 4 and clicks on "Selected Resource and Service Enhancement Detail" to display a list of included service enhancers as shown on FIG. 10. The learner decides to save two tentative solutions based on Package 4, one including all four available service enhancers and one with only two, as shown on FIG. 11. The four included service enhancers would be Real time technical terms glossary, Webconferencing for screen sharing, Webcam to see mentor, and Transcript summarizer as shown on FIG. 15. For each, the learner would select a service enhancer choice (Sametime for Webconferencing for screen sharing, for example) and then directly compare the two alternative service solutions from the perspective of their Combined Primary Service and Service Enhancers Criteria Values as shown on FIG. 11.

If no acceptable education services bundles were provided, the learner may return to the Context Selection Workspace to redefine their query or select a different user context such as "Commuting Techie." The learner may also elect to return to the Detail Specification Workspace to change the default value of the context attribute "Mentoring Method" from Text Chat to Phone and to add or remove Value Resource Parameters for the attribute value Phone or other context attribute values associated with context attributes such as "Connectivity" or "Self Study Method." The learner may also change their combined primary service enhancers selection criteria, the weighting of the selection criteria, and the minimum/maximum values for any selection criteria, in hopes of identifying additional relevant resources.

Once the learner has selected an education services bundle by double clicking on any data point on the graph of that education service bundle on the User Results Display Workspace they are taken to the User Service Enhancers Management Workspace (FIG. 12) if the execution of the education services bundle is to begin immediately, or the are returned to it at the point in the future when they are actually beginning the education.

During the execution of their education package the learner manages their mix of current service enhancers and has access to additional potential service enhancers by using the User Service Enhancers Management Workspace (FIG. 12).

At any time during the execution of the current services the learner can terminate their execution by clicking on the "Drop Now" button or extend them beyond their scheduled end time by entering a new time in the Extend column. The learner can also indicate that they want the service enhancer included when they access this saved education package from the User Overview Workspace (FIG. 3) or Historical Service Display Workspace (FIG. 4) for purposes of using the it as a template for a future education need.

If some new relevant service enhancers, for example the ability to switch to a different language in text chat with automated translation so the learner can use their native language instead of English, become available during the execution of the education package due to changes in price or availability of the service enhancers or due to changes in the learner's affective data, the Refresh button on FIG. 12 will flash, giving the learner the option to click on it to have the list of available services updated.

If the learner then decides to add a service enhancer they click in the Select Now column and then on the button "Execute the selected Service Enhancers." Alternatively, they can elect to include this new service enhancer during their next education experience and it will be saved as part of the education package.

In the example of education the primary resource may or may not be a physical resource (i.e. computer based training on Linux) and some or all of the service enhancers can be delivered electronically. In that case, the learner clicks on the button "User Execution Workspace Icon" on the User Service Enhancers Management Workspace (FIG. 12) to be taken to the User Services Management Workspace (FIG. 13), where the electronic service enhancers (i.e. transcript summarizer and web conferencing as indicated in FIG. 15) are delivered along with the primary resource if it is in electronic form. At any time the learner can review their current services by clicking on the Current Services Icon and review available service enhancers by clicking on the Available Services Icon as indicated on FIG. 13. Both of these icons will flash to alert the learner to conditions such as a current service ending or the availability of additional service enhancers."

How an education provider uses the Provider Workspace for Pricing, Bundling, and Measurements Evaluation to manage service information.

"The Provider Workspace for Pricing, Bundling and Measurements Evaluation (FIG. 17) is workspace is the provider console where an education provider can manage and control the detail execution of the business, by setting one or more parameters for business effectiveness measurement, selecting one or more user contexts, setting values for detail attributes of services and service enhancers for the selected user context, and selecting criteria for pricing and bundling guidelines. In this console, the education provider can review details of services and service enhancers provided to each user context. For each service or service enhancer, the education provider can review/modify the values of various attributes, including the unit price, effective metric, capacity, bundling partners, and recommendation schemes.

How an education provider uses the Provider Negotiations/Auction Workspace to receive bids on component services from its suppliers.

The task of an education provider is aggregating (bundling) one or more services and service enhancers from various suppliers, managing the information on those collected services and service enhancers by using the Provider Workspace for Pricing, Bundling, and Measurement Evaluation workspace (FIG. 17), and selling the service package by using catalog publication or auctions. Education providers employ the Provider Negotiation/Auction Workspace (FIG. 18) for performing the last task, i.e., bundling one or more services and service enhancers from various suppliers, by using auctions. This process starts with the "Auction Design." The education provider brings up an auction form template and fills out the template to create a new auction. The auction form requires the specification of some attributes related to the auction management, e.g., start and close time, and reserve price. For creating bundled services by aggregating primary services and various service enhancers, the education provider usually creates an auction that procures multiple services/products at a time, instead of one service/product at a time. Such auctions are often referred to as "bundle auction" or "combinatorial auction." Once the auction form is created, the education provider launches the auction by clicking on the "Auction Launch" button in the workspace.

Once the auction is launched in the network, the education provider (the owner of the auction) and its suppliers (potential bidders) can view the auction request in the workspace, and suppliers can submit one or more bids to it. User of this auction workspace, i.e., education providers and their suppliers (potential bidders) can review the information on auctions launched in this site in the "Auction Status" workspace. If desired, an education provider or a supplier can review detail information on an auction, e.g., the number of submitted bids and their details, in the "Auction Detail" workspace. Suppliers, i.e., bidders may want to use this information before and after making their bids. Also, the education provider (the auction owner) may want to review this information to check its status. After some time, when the auction close criterion is met (e.g., the close time specified in the "Auction Design" workspace), the auction engine parses all the submitted bids and decided on one or more winning bids among them.

The suppliers of the winning bids will have contracts with the education provider, and the services and service enhancers of the winning bids will be recorded and managed in the Provider Workspace for Pricing, Bundling, Measurements Evaluation (FIG. 17).

While it is apparent that the invention herein disclosed is well calculated to fulfill the objects stated above, it will be appreciated that numerous modifications and embodiments may be devised by those skilled in the art, and it is intended that the appended claims cover all such modifications and embodiments as fall within the true spirit and scope of the present invention.

Having thus described our invention, what we claim as new and desire to secure by Letters Patent is as follows:

1. A self service system for service enhanced resource delivery comprising a computer system for enabling entry of a query for a service and, entry of one or more user context elements, each element representing a context associated with the current buyer state and having context attributes and attribute values associated therewith, said mechanism further enabling buyer specification of relevant service selection criteria for enabling expression of relevance of service results in terms of user context, said computer system providing service response sets having services that match the buyer's query, user context attributes and user defined relevant services selection criteria; presenting the service response sets to the buyer, including expressing a relevance of each of the service sets in terms of user context to facilitate service set selection; and enabling the buyer to select and modify the user context attribute values to enable increased specificity and accuracy of the query from the buyer.

2. A self service system according to claim 1, wherein the context associated with the current buyer state includes affective (emotive) data such changes in facial expressions, voice and body temperature.

3. A self service system according to claim 2, wherein the affective (emotive) data is used to inform the user context to aid in the buyer's selection and fine tuning of relevant service bundles.

4. A self service system according to claim 2, wherein the affective (emotive) data is used to inform the user context to aid in recommending changes in service configurations during delivery.

5. A self service system according to claim 1, wherein the computer system includes a graphical user interface (GUI) enables buyers to select the types of affective data about them to be collected, the relative weighting to give each type of data, and the actions authorized based on changes in the data.

6. A self service system according to claim 1, further comprising a visual decision support tool enables buyers to perform confirmatory analysis, what if analysis and iterative, undirected exploratory analysis of alternative services bundles.

7. A self service system according to claim 1, wherein the computer system includes a graphical user interface (GUI) enables buyers to dynamically manage the services mix during delivery based on changes in relevancy and price.

8. A self service system according to claim 1, wherein the computer system includes a graphical user interface (GUI) enables buyers to save and reuse successful service bundles as templates for future buying decisions.

9. A self service system according to claim 1, wherein the computer system includes a graphical user interface (GUI) enables service providers to approve service pricing changes or bundling of services with other providers based on system provided buyer context based performance metrics.

10. A self service system according to claim 1, wherein the computer system includes a graphical user interface (GUI) enables service providers to respond to reverse (buyer initiated) auctions including proposals for the bundling of services from different providers.

11. A self service system for service enhanced resource delivery, comprising a computer systems for enabling entry of a query for a service and entry of one or more user context elements, each element representing a context associated with the current buyer state and having context attributes and attribute values associated therewith, said computer systems including a software tool further enabling buyer specification of relevant service selection criteria for enabling expression of relevance of service results in terms of user context.

12. A self service system according to claim 11, further comprising a visual decision support tool which enables buyers to perform confirmatory analysis, what if analysis and iterative, undirected exploratory analysis of alternative service bundles.

13. A self service system according to claim 11, wherein the computer system includes a graphical user interface (GUI) which enables buyers to dynamically manage the services mix during delivery based on changes in relevancy and price.

14. A self service system according to claim 11, wherein the computer system includes a graphical user interface (GUI) which enables buyers to save and reuse successful service bundles as templates for future buying decisions.

* * * * *